(12) United States Patent
Gorman et al.

(10) Patent No.: US 8,271,264 B2
(45) Date of Patent: Sep. 18, 2012

(54) SYSTEMS AND METHODS FOR NATURAL LANGUAGE COMMUNICATION WITH A COMPUTER

(75) Inventors: John G. Gorman, Del Mar, CA (US); John W. R. Gorman, Auckland (NZ)

(73) Assignee: Glace Holding LLC, Del Mar, CA (US)

( * ) Notice: Subject to any disclaimer, the term of this patent is extended or adjusted under 35 U.S.C. 154(b) by 0 days.

(21) Appl. No.: 12/669,454

(22) PCT Filed: Apr. 30, 2009

(86) PCT No.: PCT/US2009/042388
§ 371 (c)(1),
(2), (4) Date: Jan. 15, 2010

(87) PCT Pub. No.: WO2009/135051
PCT Pub. Date: Nov. 5, 2009

(65) Prior Publication Data
US 2010/0211379 A1    Aug. 19, 2010

(51) Int. Cl.
*G06F 17/27* (2006.01)
*G10L 13/00* (2006.01)
(52) U.S. Cl. .......................................... 704/9; 704/258
(58) Field of Classification Search ................. 704/9
See application file for complete search history.

(56) References Cited

U.S. PATENT DOCUMENTS

| | | | |
|---|---|---|---|
| 6,101,537 A | 8/2000 | Edelstein et al. | |
| 7,085,708 B2 * | 8/2006 | Manson | 704/9 |
| 2003/0144831 A1 * | 7/2003 | Ford | 704/9 |
| 2004/0181390 A1 | 9/2004 | Manson | |
| 2006/0041424 A1 * | 2/2006 | Todhunter et al. | 704/9 |
| 2007/0185859 A1 * | 8/2007 | Flowers et al. | 707/5 |
| 2007/0203693 A1 | 8/2007 | Estes | |

OTHER PUBLICATIONS

Y. Wilks, "Is There Progress on Talking Sensibly to Machines?" Science, 318: 927-928 (2007).
International Search Report and Written Opinion for PCT/US09/42388 mailed Nov. 30, 2009 (11 pages).

* cited by examiner

*Primary Examiner* — Samuel G Neway
(74) *Attorney, Agent, or Firm* — Procopio Cory Hargreaves & Savitch LLP; Noel C. Gillespie

(57) ABSTRACT

A system for natural language communication with a computer, comprising a database configures to store at least one table the table configured to store associations between concepts in a text string and associated concept identifiers; and a builder interfaced with the database, the builder configured to construct a concept defined by a text string by performing a process comprising the following steps: assigning a unique identifier to the concept, breaking the concept into sub-concepts, assigning a unique identifier to each sub-concept, using legal joins to join sub-concepts into higher order sub-concepts, assigning a unique identifier to the higher-order concepts, and repeating the steps until the higher order sub-concepts join to form the concept, and storing the concept, sub-concepts, higher order sub-concepts and unique identifiers in a table in the database.

21 Claims, 13 Drawing Sheets

| ID | Type | Reference | Vocab | Lookup | CF | Concept | Respon | Text |
|---|---|---|---|---|---|---|---|---|
| 174 | | 001.001.287 | Does | | | Does | | Does |
| 175 | | 001.001.288 | Batman | | | Batman | | Batman |
| 176 | | 001.001.289 | have | | | have | | have |
| 177 | | 001.001.290 | a | | | a | | a |
| 178 | | 001.001.291 | nemesis | | | nemesis | | nemesis |
| 179 | | 001.001.292 | ? | | | ? | | ? |
| 182 | | 001.001.293 | | a~nemesis | C+ | AN | | a nemesis |
| 183 | | 001.001.294 | | have~AN | C+ | HAN | | have a nemesis |
| 184 | | 001.001.295 | | Batman~HAN | C+ | BHAN | | Batman have a nemesis |
| 185 | | 001.001.296 | | Does~BHAN | C+ | DBHAN | YTJ | Does Batman have a nemesis |
| 186 | | 001.001.297 | | DBHAN~? | C+ | DBHAN? | YTJ | Does Batman have a nemesis? |
| 187 | | 001.001.298 | | | | YTJ | | Yes, The Joker |
| 188 | | 001.001.299 | | | | | | |

| Reference | Vocab | Lookup | CF | Concept | Response | Text |
|---|---|---|---|---|---|---|
| 001.001.000 | Observation1 | | S | Observation1 | | At a most basic level, Richard Price's new book is a police procedural. |
| 001.001.200 | | | | | | |
| 001.001.201 | At | | | At | | At |
| 001.001.202 | a | | | a | | a |
| 001.001.203 | most | | | most | | most |
| 001.001.204 | basic | | | basic | | basic |
| 001.001.205 | level | | | level | | level |
| 001.001.207 | , | | | , | | , |
| 001.001.208 | Richard | | | Richard | | Richard |
| 001.001.209 | price's | | | Price's | | Price's |
| 001.001.210 | new | | | new | | new |
| 001.001.211 | book | | | book | | book |
| 001.001.212 | is | | | is | | is |
| 001.001.213 | a | | | a | | a |
| 001.001.214 | police | | | police | | police |
| 001.001.215 | procedural | | | procedural | | procedural |
| 001.001.218 | | | | | | |
| 001.001.220 | | most~basic | C+ | MB | | most basic |
| 001.001.221 | | MB~level | C | MBL | | most basic level |
| 001.001.222 | | a~MBL | C+ | AMBL | | a most basic level |
| 001.001.223 | | At~AMBL | C+ | AAMBL | | At a most basic level |
| 001.001.224 | | AAMBL~, | C+ | Observation32 | | At a most basic level, Richard Price's new book is a police procedural |
| 001.001.224 | | | | | | |
| 001.001.225 | | Richard~Price's | C | RP | | Richard Price's |
| 001.001.226 | | new~book | C | NB | | new book |
| 001.001.227 | | RP~NB | C+ | RPNB | | Richard Price's new book |
| 001.001.231 | | | | | | |
| 001.001.232 | | police~procedural | C | PP | | police procedural |
| 001.001.233 | | a~PP | C+ | APP | | a police procedural |
| 001.001.236 | | | | | | |
| 001.001.237 | | AAMBL~, | | Observation32 | | At a most basic level, Richard Price's new book is a police procedural |
| 001.001.238 | | RPNB~is | | RPNBis | | Richard Price's new book is |
| 001.001.239 | | RPNBis~APP | | Observation32 | | At a most basic level, Richard Price's new book is a police procedural |
| 001.001.250 | | Observation32~Observation32 | | Observation32 | | At a most basic level, Richard Price's new book is a police procedural |
| 001.001.250 | | | | | | |

FIG. 7

| ID | Type | Reference | Vocab | Lookup | CF | Concept | Response | Text |
|---|---|---|---|---|---|---|---|---|
| 40 | | 001.001.220 | | P11^ | C | P11 | | P11 |
| 143 | | 001.001.221 | | Pa11^ | C | Pa11 | | Pa11 |
| 174 | | 001.001.222 | | V11^ | C | V11 | | V11 |
| 180 | | 001.001.223 | | T11^ | C | T11 | | T11 |
| 181 | | 001.001.224 | | L11^ | C | L11 | | L11 |
| 182 | | 001.001.225 | | M11^ | C | M11 | | M11 |
| 183 | | 001.001.226 | | R11^ | C | R11 | | R11 |
| 383 | | 001.001.227 | | | | | | |
| 148 | | 001.001.230 | | P11^Ob11 | C | Ob11 | | P, Pa, S, Or Ob V, T, L, M, R |
| 142 | | 001.001.231 | | Pa11^Ob11 | C | Ob11 | | P, Pa, S, Or Ob V, T, L, M, R |
| 47 | | 001.001.232 | | S11^Ob11 | C | Ob11 | | P, Pa, S, Or Ob V, T, L, M, R |
| 141 | | 001.001.233 | | Or11^Ob11 | C | Ob11 | | P, Pa, S, Or Ob V, T, L, M, R |
| 139 | | 001.001.234 | | Ob11^V11 | C | Ob11 | | P, Pa, S, Or Ob V, T, L, M, R |
| 135 | | 001.001.235 | | Ob11^T11 | C | Ob11 | | P, Pa, S, Or Ob V, T, L, M, R |
| 147 | | 001.001.236 | | Ob11^L11 | C | Ob11 | | P, Pa, S, Or Ob V, T, L, M, R |
| 51 | | 001.001.237 | | Ob11^M11 | C | Ob11 | | P, Pa, S, Or Ob V, T, L, M, R |
| 137 | | 001.001.238 | | Ob11^R11 | C | Ob11 | | P, Pa, S, Or Ob V, T, L, M, R |
| 138 | | 001.001.239 | | Ob11^ | C | Ob11 | | |
| 367 | | 001.001.240 | | | | | | |
| 54 | | 001.001.300 | | | C | | | |
| 388 | | 001.001.301 | | when^Ob11 | | T11 | | whenOb11 |
| 389 | | 001.001.303 | | where^Ob11 | | L11 | | whenOb11 |
| 390 | | 001.001.305 | | how^Ob11 | | M11 | | M11 |
| 339 | | 001.001.307 | | that^Ob11 | | thatOb12 | | thatOb12 |
| 392 | | 001.002.307 | | that^Ob11 | | thatOb11 | | thatOb12 |
| 157 | | 001.002.208 | | | | | | |

FIG. 9

| ID | Type | Reference | Vocab | Lookup | CF | Concept | Response | Text |
|---|---|---|---|---|---|---|---|---|
| 347 | | 001.002.301 | A | | | A | | A |
| 348 | | 001.002.302 | B | | | B | | B |
| 349 | | 001.002.303 | C | | | C | | C |
| 350 | | 001.002.304 | , | | | , | | , |
| 351 | | 001.002.305 | and | | | and | | and |
| 352 | | 001.002.306 | or | | | or | | or |
| 353 | | 001.002.307 | | A, | | A, | | A, |
| 364 | | 001.002.307 | | A, ˜and13 | | and13 | | A, B and C |
| 365 | | 001.002.307 | | A, ˜or13 | | or113 | | A, B or C |
| 354 | | 001.002.308 | | and˜C | | AC | | and C |
| 361 | | 001.002.309 | | or˜C | | OC | | or C |
| 355 | | 001.002.310 | | B˜AC | | and13 | | B and C |
| 363 | | 001.002.311 | | B˜OC | | or13 | | B or C |
| 356 | | 001.002.312 | | and13˜BAC | | and13 | | A, B and C |
| 362 | | 001.002.313 | | or13˜BAC | | or13 | | A, B or C |
| 359 | | 001.002.314 | | | | | | |

FIG. 10

| ID | Type | Reference | Vocab | Lookup | CF | Concept | Response | Text |
|---|---|---|---|---|---|---|---|---|
| 98 | | 001.002.203 | a | | | a | | a |
| 105 | | 001.002.204 | king | | | king | | king |
| 109 | | 001.002.205 | queen | | | queen | | queen |
| 112 | | 001.002.206 | beautiful | | | beautiful | | beautiful |
| 113 | | 001.002.207 | princess | | | princess | | princess |
| 118 | | 001.002.208 | | a~king | C+ | AK | | a king |
| 119 | | 001.002.209 | | a~queen | C+ | AQ | | a queen |
| 120 | | 001.002.210 | | beautiful~princess | C | BP | | beautiful princess |
| 122 | | 001.002.211 | | a~BP | C+ | ABP | | a beautiful princess |

FIG. 11

| | the | the | the | the | the | the | the | the | the |
|---|---|---|---|---|---|---|---|---|---|
| The | contribution | contribution | contribution | contribution | contribution | contribution | contribution | contribution | TCOAGNCGGTRF |
| contribution | of | of | of | of | of | of | of | COAGNCGGTRF | |
| of | a | a | a | a | a | a | OAGNCGG | | |
| a | given | given | given | given | given | AGNCGG | | | |
| given | non-CO2 | | | | | | | | |
| non-CO2 | greenhouse | | | | | | | | |
| greenhouse | gas | GG | NCGG | GNCGG | | | |

SYSTEMS AND METHODS FOR NATURAL LANGUAGE COMMUNICATION WITH A COMPUTER

BACKGROUND

1. Technical Field

The embodiments described herein are directed to natural language communication with a computer, and more particularly to methods for generating an using databases that link language and punctuation with concepts that allow a computer to communicate using natural language and to take appropriate action in response to requests and directives.

2. Background

Yorick Wilks indicates in his review of the state of the art in Wilks Y. *Is there Progress on Talking Sensibly to Machines?* Science. 318: 927-927 (2007), that the problem with talking sensibly to a machine is that adequate theory for doing so does not exist. Developing a machine capable of understanding human thought and natural language has been the goal of computer science since Turing first proposed the Turing Test in the 1930's; however, although current computer programs can process text and do word search and speech to text at a high level, virtually no current programs are able to understand the meaning incorporated in text.

a. General Overview

In the embodiments described in the section entitled "Detailed Description," a database medium for representing intellectual knowledge as managed and stored by operations of the human mind and memory is presented. This database medium can be referred to as the Fifth Medium, or M5, which is basically an alternative to language, which can be referred to as the Fourth Medium, or M4. Intellectual knowledge, also called descriptive knowledge, declarative knowledge, or propositional knowledge, is the kind of knowledge that is expressed in finite sentences or indicative statements. It requires a functioning hippocampus for its acquisition and retention in the human mind and memory.

There are five parallel media that can represent and manage declarative knowledge: Declarative knowledge in any one medium can be readily mapped onto one of the other media. The world itself is the First Medium, or M1, for the storage of knowledge about itself. Operations of the human mind, thought and memory, incorporated in the human brain, are the Second Medium, or M2, of knowledge storage. Knowledge can also be represented in other diverse ways: physical models, artworks, pictures, diagrams, blueprints, graphs, spreadsheets, databases, mathematical models, formulae, etc. This varied lot of graphic or mathematical knowledge management systems can be lumped together as the Third Media, or M3, of knowledge. Language is the Fourth Medium, or M4, of knowledge storage.

i. The First Medium-Reality

The real world is often said to be the most precise and detailed record of its present self. For the purposes of the descriptions included herein, both real and imaginary worlds can be considered as the First Medium.

ii. The Second Medium-Knowledge in the Mind

Operations of the human mind and brain are the Second Medium of declarative knowledge representation. Human thoughts model real things and states, events, and actions in the real present world around us or in some imaginary or memory world: Clear mental concepts are well understood, managed by the human mind and stored in memory as an ordered assembly readily accessible to consciousness, which is popularly termed the "mind's eye." A block of declarative knowledge on any subject can be held and processed at very high skill levels in the human memory supported by a neural correlate of billions of interconnected neurons and selectively strengthened synapses; and readily translated into language, i.e., M4. The principles of the neural mechanisms that the brain employs for holding and operating on this kind of knowledge are not well understood.

John Locke's approach to the operations of the mind is laid out in his *An Essay Concerning Human Understanding* (1692). Locke makes the point that clear mental concepts are well understood by the mind. What John Locke called ideas and defined so well in his *Essay* can interchangeably be called concepts herein. Locke spells out what a clear idea is and how simple ideas can be assembled by operations of the mind into complex ideas, which he calls mixed modes.

After reading Book II of the Locke's *Essay* one understands what simple ideas are and that they are very clear and distinct in the mind. Locke points out that ideas are perfectly clear to the person thinking them. Ideas or concepts are made of intangible mental stuff that the mind experiences. They are conscious representations of real or imaginary items, matter or events in the world around us. A concept can be thought of as what goes on in the mind when it is experienced.

Thus, Locke teaches that everyone has clear ideas in his mind, which are simple atomic ideas like sweetness, bitterness, fire, heat, the sun, etc. Here is Locke's definition of an idea:

"Though the qualities that affect our senses are, in the things themselves, so united and blended, that there is no separation, no distance between them; yet it is plain, the ideas they produce in the mind enter by the senses simple and unmixed. For, though the sight and touch often take in from the same object, at the same time, different ideas;—as a man sees at once motion and colour; the hand feels softness and warmth in the same piece of wax: yet the simple ideas thus united in the same subject, are as perfectly distinct as those that come in by different senses. The coldness and hardness which a man feels in a piece of ice being as distinct ideas in the mind as the smell and whiteness of a lily; or as the taste of sugar, and smell of a rose. And there is nothing can be plainer to a man than the clear and distinct perception he has of those simple ideas; which, being each in itself uncompounded, contains in it nothing but one uniform appearance, or conception in the mind, and is not distinguishable into different ideas."

*Essay, II.*

This definition correlates closely with modern neuroscience research based on recording signals from individual neurons in the brain. This work has revealed the existence of neurons that have a "receptive field" in that they fire when a particular sensory pattern is presented to the sensorium. The circuits in the brain that recognize this kind of simple sensory pattern that Locke describes so well are not yet understood. One just senses that something has a "bitter" taste or that a chair is a chair or a tree a tree, as simple atomic concepts; we do not need to dissect out their component concepts. The recognition process is unconscious and it is not yet understood exactly how the brain circuits perform this process.

Locke shows how complex concepts can be consciously analyzed into their simple component concepts. He goes on to show how a single lexical word can gather several component concepts into a single complex concept. Locke gives some good examples of single lexical words standing for a compounded set of simple concepts.

"Secondly, there are others compounded of simple ideas of several kinds, put together to make one complex one;— v.g. beauty, consisting of a certain composition of colour and figure, causing delight to the beholder; theft, which being the concealed change of the possession of anything, without the consent of the proprietor, contains, as is visible, a combination of several ideas of several kinds: and these I call mixed modes." *Essay II, xii,* 5.

Locke argues that clear ideas are distinct entities that can be identified, described, and assembled into formal structures that represent complex ideas. A complex mental concept is a construct of simple mental concepts akin to a molecule made up of atoms or a machine made up of parts. Locke does not expound on just how concepts are put together, i.e., the structural details with respect to how the mind builds complex concepts from atomic ones; he does not tell what specific structures form when concepts are combined, or what kind of bonds are employed between concepts.

iii. The Third Medium-Knowledge in Mathematical Models and Graphics

Just as the mind can perform thought experiments and think in pictures, many analogous media have been developed to capture, store, and transmit knowledge: pictures, paintings, photographs, videos, comics, algebraic formulae, computer simulations computer files, recordings of various kinds, blueprints, physical models, statues and mobiles, etc.; however, modern computer science is far from capable of modeling thoughts in graphic form, and a long way from creating and interpreting the declarative knowledge encoded in such media without the help of the human mind.

iv. The Fourth Medium-Knowledge Representation by Language

The Fourth medium, i.e., language, text, etc., is a one-dimensional string of just three elements: lexical words, grammatical particles and punctuation marks. Language identifies clear mental concepts involved in some domain of declarative knowledge and defines their interrelations. Humans are able to encode their ideas and mental operations into written or spoken language with extremely high fidelity. Language is able to identify individual concepts with strings of text: words, phrases, sentences, and paragraphs, headings, and larger corpora of text like chapters, books, and libraries. For each individual idea there is a preferred word, phrase, or sentence or paragraph that will describe that idea perfectly. Virtually any mental concept no matter how complex can be accurately captured by text: a word, phrase, sentence, or paragraph. And there are usually several alternate synonyms or paraphrases that describe that idea perhaps less perfectly. Language is able to specify the structure of complex ideas to very a subtle degree by deft use of its elements, lexical words, grammatical particles, and punctuation marks. And define precise relationships between ideas. Text authored by an expert often captures knowledge at a considerably higher level than the mind of a layperson can.

Language is by far our best source of data to study if we are to understand the operations of the mind, a much better approach than introspection. Since language is a precise choreography of thought, it is important to view language as precise instructions for building concepts and explicating precisely how the assembled concepts relate to each other. In this light it is easier to understand the essential function of natural language.

It is necessary to develop an understanding of just how language expressions instruct the construction of mental concepts, how language inserts values in particular locations in a complex concept structure, how language uses recursion to direct the construction of complex ideas from simple ones, how verbs describe and control how concepts change; finally, how language confers degrees of reality on concepts and distinguishes reality from memory and the imagination.

Perhaps the most important thing to recognize about language is how much is left unsaid. It will be a long time before it will be possible to transfer the declarative knowledge implicit in a text to a computer without human help in choosing the sense of lexical words meant in each instance, without explicitly supplying the meaning of grammaticals and punctuation marks, allusions, and metaphors, without a glossary of lexical words, without human help in imagining and adding back in all the concepts that are left unsaid in language. Perhaps the most significant need in talking sensibly to computers is managing the concept ellipsis that is forced upon language because it is such a slow communication channel.

SUMMARY

A system that allows natural language communication with a computer system in a straight forward manner that can be easily implemented is described herein.

In accordance with one aspect, system for natural language communication with a computer, comprising a database configures to store at least one table the table configured to store associations between concepts in a text string and associated concept identifiers; and a builder interfaced with the database, the builder configured to construct a concept defined by a text string by performing a process comprising the following steps: assigning a unique identifier to the concept, breaking the concept into sub-concepts, assigning a unique identifier to each sub-concept, using legal joins to join sub-concepts into higher order sub-concepts, assigning a unique identifier to the higher-order concepts, and repeating the steps until the higher order sub-concepts join to form the concept, and storing the concept, sub-concepts, higher order sub-concepts and unique identifiers in a table in the database.

In accordance with another aspect, A system for natural language communication with a computer, comprising a user interface configured to receive an input text string; a database configures to store at least one table the table configured to store associations between concepts in a text string and associated concept identifiers; and a parser interfaced with the database and the user interface, the parser configured to identify a concept represented by the text string using a process comprising the following steps: breaking the text string into component concepts, identifying sub-concepts from the component concepts by searching the table for legal joins between the component concepts, forming the sub-concepts by joining the component concepts as specified by the table, identifying higher order sub-concepts form the sub-concepts and component concepts by searching the table for legal joins between the component concepts an sub-concepts, and repeating the steps until the concept representing the text string is identified and formed.

These and other features, aspects, and embodiments of the invention are described below in the section entitled "Detailed Description."

BRIEF DESCRIPTION OF THE DRAWINGS

Features, aspects, and embodiments of the inventions are described in conjunction with the attached drawings, in which:

FIG. 3 is a screen shot illustrating an example of a table that can be constructed in accordance with one example embodiment and used to perform the parsing of FIGS. 1 and 2;

FIG. 4 is a screen shot illustrating another example of a table that can be constructed in accordance with one example embodiment

FIG. 7 is a screen shot illustrating an example of a table that can be constructed in accordance with one example embodiment and used to perform the parsing of FIG. 6;

FIG. 9 is a screen shot illustrating another example of a table that can be constructed in accordance with one example embodiment;

FIG. 10 is a screen shot illustrating another example of a table that can be constructed in accordance with one example embodiment;

FIG. 11 is a screen shot illustrating another example of a table that can be constructed in accordance with one example embodiment;

FIG. 13 is a diagram illustrating another example method for parsing a text string in accordance with one embodiment.

DETAILED DESCRIPTION

1. The Fifth Medium of Knowledge

Figure 1:
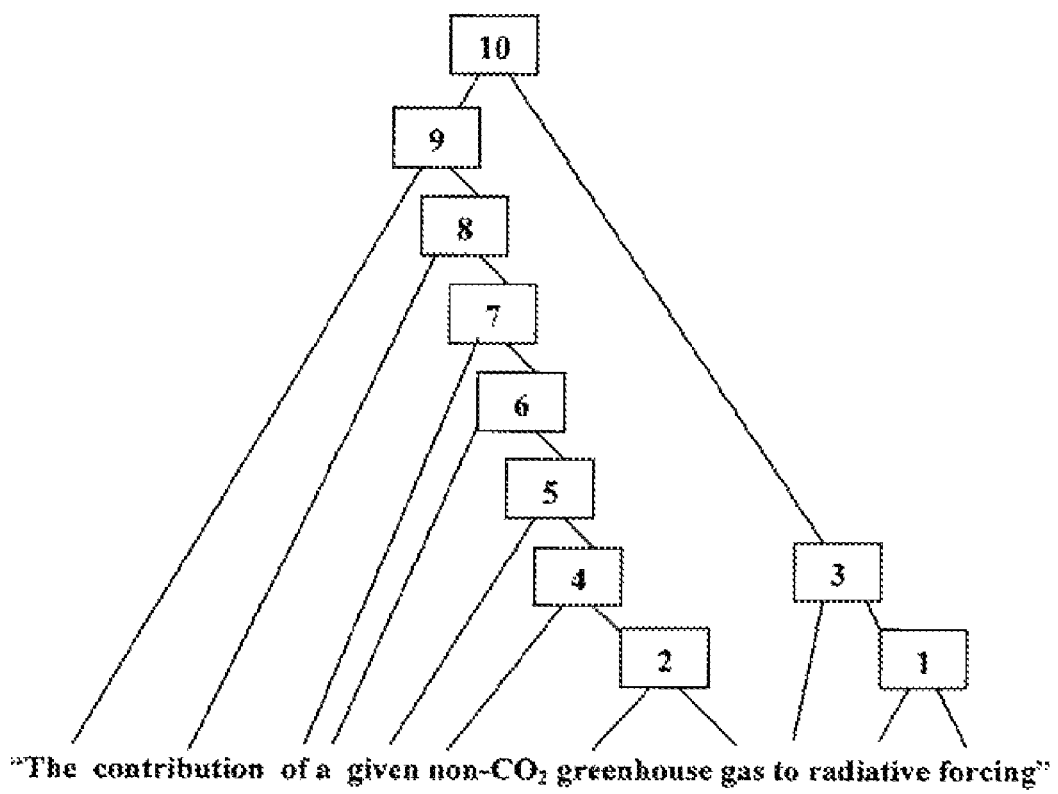
FIG. 1 is a diagram illustrating a method for parsing a text string in accordance with one embodiment.

In the embodiments described herein, domains of declarative knowledge are stored in M5 database format, closely mimicking equivalent domains of knowledge stored in language or human memory. Methods for constructing graphical representations of concept trees, which allow intimate understanding of concept structure and its relationship to thought and language will be described below. In these methods, each concept can first be given a unique ID#, and concepts of varied intellectual levels can be stored in the form of a set of novel "concept-joining" records, i.e., join rows in a database table. The methods entail each join row having a unique ID#, the ID# of the concept it represents, and pointers to ID#s of other conceptually related records, which in turn have pointers to other conceptually related records, enabling a particular set of linked records to form a proprietary tree structure able to model collectively any particular complex human thought in all its detail. For each such concept tree there is a root record that can stand in for its entire tree concept, whose unique ID# identifies and names the unique mental concept that that tree of records represents.

Many types of concept records can then be constructed, and which can represent people, places, or things of the world or of the imagination. Other concept records can represent orders, actions, plans, or whatever. Tree structures of this nature can be built and interrogated. Also described are language to meaning interface programs that can convert input text into a record tree structure or vice versa. A response program is also described that can respond to precisely identified inputs in text or from other sources, by outputting appropriate stored knowledge as text or speech, or perform actions programmatically stored in the computer.

For purposes of the embodiments described herein, it is assumed that basic mental processes run along the following lines: to build a complex mental concept, simple concepts are first joined to each other to make intermediate concepts. First, a few atomic ideas can be assembled into one sub-concept. Then another separate subassembly of simple ideas can be put together. The two subassemblies may be joined to make a more complex idea, or higher order sub-assembly. Or single or doublet ideas can be joined on to the growing complex. Then, ideas of this higher level can be combined, and so on, to form extremely complex ideas. An important aspect of this process is that even the most complex idea, be it composed of many simpler ideas, be reduced to a single unitary entity that can often be named by a single lexical word. As will be described below, the lexical words can be the equivalent of a concept ID#. Moreover the mind can appreciate that each unique idea is composed of simpler ideas and is a component of some more complex idea: Certain ideas are subcomponents, copies of which are reused in many different complex ideas but in a particular context the mind can appreciate which complex idea is being expressed. And so it goes for a vast number of mental concepts, their structure, and their relationships.

A complex concept is a composition of concept parts which when bonded together make up the concept. One of the most important operations of the mind is to construct complex ideas from simple ideas. Constructing a complex idea is similar to synthesizing a complex molecule from component molecules, groups, atoms and ions or manufacturing a complex machine from subcomponents that are built first then later assembled into the final product.

An important mental phenomenon that must be taken into account is that a concept will adapt its meaning when brought into relation with another concept just as all the elements of language, even lexical words, change their meaning in different contexts. This extreme ability of concept meaning exactly parallels the language phenomenon of words having many senses, which has been well studied.

Parsing texts according to this scheme reveals that language can be interpreted as a blow-by-blow recipe for constructing complex mental concepts from simpler component concepts. Concepts have a tree structure in which the elements of language, lexical words, grammaticals, and punctuation marks are the leaves of the tree, i.e., are the simplest ideas, which successively join in pairs to first form nodes, their locations specified by grammatical particles and punctuation marks, representing compound ideas. These compound nodes successively join at nodes, which represent more complex ideas, which continue to join at higher-level nodes until there is a single root node, which represents the entire complex idea.

Most if not all lexical words have different senses in different contexts. Methods for identifying the precise sense of the same word or phrases as the sense changes with their use in different contexts are described herein.

Some particular linguistic problems that the systems and methods described herein provide good solutions to are the following: First, the functions of the concepts meant by the lexical words: nouns, verbs, adjectives, and adverbs and a systematic interpretation of how their prefixes, suffixes, and inflections play off their meaning. Then deixis, i.e., where the same word, personal pronoun, or other grammatical word may refer to quite different concepts in different contexts. Very akin to managing deixis is managing concepts corresponding to the grammatical words of language, personal pronouns, interrogative pronouns, prepositions, conjunctions, determiners, etc.; polysemes and homonyms, where the same lexical word takes on different sense in different contexts; synonyms and paraphrases where different words and phrases have the same meaning; and ambiguity and double meaning where the same text string may have more than one meaning. A particular troubling aspect of synonyms and paraphrases is the combinatorial problem where a particular question or a particular statement, say of just 20 words, can be rephrased in millions and even trillions, of text string permutations, i.e., in the region of $2^{20}$ to $3^{20}$, and still have the same precise meaning, which renders lookup of stored word strings useless as a means of identifying the concept that a particular string means.

Further, punctuation marks, which depending on where they are inserted, can radically change the meaning of a text string. Managing the conceptual correspondents of the syntactical functions: person, number, gender, voice, tense, reality/mood, affirmation/negation, modality, finitivity, time, place, manner, and causality is another problem; however, the methods described herein can master every one of these linguistic phenomena.

In the systems and methods described herein, the results of operations of a particular human mind as it deals with the outside world, graphic media, and language and the contents of other human minds are recorded in a computer. The methods record the operations of and the results of the operations of that mind in a database of proprietary design, and can be referred to as the Fifth Medium (M5). The Fifth Medium aims to bio-mimic the mind and language in the way they represent real and conceptual entities. An in-silico medium able to perform this function of holding, storing, and managing concepts and interfacing with natural language, directly tackles the task of modeling human mental concepts, identifying, and relating them to each other.

Language is a recording medium, not a computing medium. Likewise M5 records the thoughts, ideas, and conclusions of a human mind; it does not create them. Thus, it can be convenient to source an M5 database from a written document because the recording to the thoughts and ideas of the author has already been done.

The Fifth Medium, which although closer to language than any of the other media, is vitally different from language. Knowledge is stored as related numbers not text. It directly tackles the task of modeling the structure of human mental concepts in a computer database where the ideas of any domain of knowledge are cataloged, identified, annotated, and related to each other. Though it closely parallels language in modeling thought, knowledge is held in database format. In M5, units of data are numbers not text.

A very important aspect of an M5 knowledge base is that all of the concepts implied but not explicit in the text of a knowledge domain are restored in M5, i.e., the mental process of taking one's uncompressed thoughts, compressing the data for transmission as language to a second person, who decompresses the transmission to obtain the original uncompressed knowledge. This is a process, e.g., equivalent to the MPEG compression-decompression of video data.

The systems and methods described herein comprise a database platform and closely integrated computer programs that model human thought in the computer and allow humans to freely access the knowledge stored via natural language. M5 can be configured to encode the structural details of the most abstruse, profound, intellectual, technical, complex ideas with absolute precision. A parser program can be configured to parse very cryptic text inputs, i.e., deal with deixis, metaphors, allusions, and double meanings at fully human skill levels. Humans can also issue precise commands in natural language, which the systems and methods can obey, i.e., a true human-machine interface. Human users can also see what and how information is stored in the computer by inspection of the database.

Declarative knowledge stored in M5 format, in contrast to declarative knowledge stored in language, is stored in more comprehensive, higher density fashion. Specifically each domain of knowledge can be stored as a set of database tables listing all the concepts in that domain of knowledge, plus specific information about the relations between them, along with as much metadata about each concept as desired. M5 can capture the precise structure of complex concepts by defining their constituent concepts, and precisely define how they are put together to form complex conceptual structures.

Join rows can be used to define precisely how complex concepts are constructed. In general, if the knowledge in a certain domain can be defined with (n) words, the number of concepts that are captured in the M5 version would be approximately (2n). M5 captures the precise structure of each complex concept including what all of its constituent concepts are and precisely how they are put together to form the complex structure.

It requires a sophisticated human mind with considerable background knowledge to read and understand, say, a scientific article. Computers simply cannot do this; however, a relatively simple computer program can read a M5 database version of the same article, understand the concepts there, and extract any particular desired item of knowledge. And this ability is scalable. For example, say that a particular book of 500,000 words may or may not contain a particular piece of knowledge of interest. It would take a considerable effort for a human reader to find that item or find that it was not there; however, if the book were published in M5 as well as language text, then a computer program would find and present this item of knowledge in a fraction of a second or find that it was not there.

2. Introduction to the Systems and Methods Described Herein

What is a concept? Say a certain event occurred in 1941, e.g., Japan attacked Pearl Harbor. Pearl Harbor is a clear concept, 1941, the year, is a clear concept. The event, the Japanese attack, is a clear concept that will be experienced in the human mind when the words are read. The observer clearly sees, knows, and can manage the relationship between them. The mind can easily combine the three ideas to make a single compound concept: the Japanese attack on Pearl Harbor in 1941. For another example, take an 1800 word article on the importance of non-CO2 gases like Methane in climate change. Examples of individual concepts in this article are terms like climate change, greenhouse gas, the average surface temperature of the earth, a hydrofluorocarbon, rise in the concentration of methane, radiative forcing, and facts like atmospheric methane causes global warming, and degrees like very rapid, times like the 1980s, etc. As mentioned, if the knowledge in a certain domain can be defined with (n) words, the number of concepts that will need to be captured in the M5 version is approximately (2n). So an 1800 word article like the methane article above would deal with about 3600 concepts or ideas. Virtually any mental concept, no matter how complex, can be accurately captured by text: a word, phrase, sentence, or paragraph.

Because language is such a slow communications channel, it has developed quite remarkable and ingenious data compression techniques to radically abbreviate utterances, which imply but do not explicate many of the concepts transmitted by the speaker, i.e., those concepts which can readily be reinstated by the listener. This has caused serious problems for natural language computing for 50 years because computers are still years away from matching the marvelous facilities of the human imagination; however, the systems and methods described herein include methods that master this problem at a fully human level by providing a format for uncompressed knowledge.

Another linguistic phenomenon that has defeated researchers is that the same lexical word will have a different meaning each time it is used, even in the same sentence. For example, consider the senses of "bank" in the following sentence: "you can bank on me to meet you on the left Bank outside the Swiss Bank, where I bank." To talk sensibly to a computer, software programs have to determine which of these many possible senses applies in each instance. This sounds formidable; but the systems and methods described herein master this problem to fully human levels.

An enormous effort has been pursued by natural language processing groups to catalog the senses of lexical words. Wordnet, the Princeton University Cognitive Science Laboratory database of English lexical words contains over 200,000 word-sense pairs organized as a collection of synsets, i.e., collected sets of the different observed relatively fixed senses of a given word. The members of synsets are further typed as "homonyms" or "polysemes." But the sense of a lexical word is infinitely variable. For example, "Brush your teeth and hair" is a zeugma because the meaning of brush in these two contexts is specifically different and there is room for many, many senses of brush in other contexts.

In a M5 database, each individual concept can be represented by a record or row. Each concept record or row can then have a unique ID#. Besides its ID#, each row can also contain the ID#s of a pair of mental concepts that were joined to make it, each represented by their own row in the database, as well as the set of ID#s of the more complex concepts that this concept is or can be a component of.

Thus, in an M5 database, each concept can be represented by its own row in the database. Each record can have pointers to ID#s of other conceptually related rows, which in turn have pointers to other conceptually related records. This allows a particular set of linked records to collectively form a proprietary tree structure able to model a particular human thought in all its detail. Each component row of this tree can represent one of the subcomponent concepts that make up the complex concept. And the pointers specify that subconcept's exact place in the complex concept structure it is part of For each such concept tree there is a root record that can stand in for its entire tree concept, whose unique ID# identifies and names the unique mental concept that that tree of records represents. Thereby, a complex concept can be represented in the database by this tree structure, or by a single row, or by an ID#.

The systems and methods described herein can also include graphical representations of these structures, akin to those used to represent the arrangement of atoms in chemical molecules. These graphics, e.g., M3 representations, provide great insight into thought and the operations of the mind and how language is able to choreograph thought. Graphics can be used to reflect and illustrate the structures embodied in the trees represented in a M5 database, and methods that interact with them.

Concept records can include other fields containing specifiers of various other properties of the mental concept they represent, which media is host to the concept, whose mind it is being held in, or in what text, its concept type, and any other useful property. The systems and methods described herein provide ways to annotate concepts as to their social significance, their relative importance or value to a person or institution, and/or their danger or risk. Thus, for example, concepts can be compared and valued as to which is the better way. A response field containing pointers to rows that represent actions or responses can also be included in a M5 database. A field containing the text string and its paraphrases that best identify and describe the concept can also be included.

Special types of concept can also be employed. For example, the observation concept, where an observer declares that certain concepts exist in a particular relation, and the question concept, which is a probe concept that asks another observer whether a relation between certain concepts exists in the database or what a certain subconcept of the relation might be. Language versions of these two concept types can be the information packets that are transmitted between human minds to transfer or request declarative knowledge. They are exactly matched in the mind by the idea transmitted and received and in language by a finite sentence, i.e., a question or a command. Another special concept is the action concept, which drives an action that the computer can take.

Finally, users can build data tree structures of this nature able to model any particular human thought in all its detail. If familiar with the data format, a user can manually create records in the database, which store his mental ideas, by entering data in the appropriate format. Or examine the database and understand the knowledge stored there. Tree structures of this nature can be built or interrogated automatically.

To understand the systems and method described herein, the first idea that must be grasped is that lexical words, grammatical words, and punctuation marks, the elements of text, are all considered to be symbols that stand for mental concepts. Then, that a phrase stands for a single concept albeit more complex than that of one of its words. And sentences, even those with several subordinate clauses, stand for a single concept. Whole paragraphs stand for a single complex concept. Text is necessarily a one-dimensional noncommutative string of language elements, words or punctuation marks, each one identifying a clear atomic concept but which contains the necessary instructions for assembling them into a single complex concept. A small change in the order of text elements can cause a radical change in meaning.

All declarative knowledge is relative to an observer; the critically important relationship between the observer and his knowledge is fully captured in M5 as described herein. In a M5 knowledge base, all of the concepts implied but not explicit in text versions of a knowledge domains are restored. A parser program can be used to parse very cryptic text inputs, i.e., deal with deixis, metaphors, allusions, and double meanings at fully human skill levels. Using the systems and methods described herein, a user can pose a question to a computer in the same natural way they would when asking another human for a desired piece of information.

3. Concept Construction—Theory and Methods a. Introduction

As noted, the first idea to be grasped is the idea that a complex concept is a composition of simpler concepts. When simple concepts are assembled into complex concepts, the structure formed is, in the terms of Graph Theory, a labeled graph, a directed mostly binary tree, yet having many vertices of higher valence. On this basis therefore, the systems and methods described herein make use of a tree structure to model clear thoughts.

An observer has considerable flexibility as to how he makes any observation, i.e., how he sees and states events or actions in the world or in some imaginary world. Different observers may not agree on what they are observing; however, in every case a particular set of joins (see below) can be created, one way or another, to perfectly reflect the concepts and their relations as interpreted idiosyncratically.

Text strings can be considered instructions for constructing mental concepts. Each individual element of the text string, lexical word, grammatical particle, or punctuation mark, is a concept. Short strings define simple concepts; long strings tend to define complex concepts. As explained below, the meaning of a long string, i.e., its concept, should be parsed into or gathered together into a single point concept. A parsing program can be configured to interpret exactly how the speaker intended the simple concepts named by the words to be conjoined by consulting the database join table, which lists all of the joins made to construct the tree structure that models a complex concept. As each simple concept, and ultimately compound concept, is built up, it is given its own unique ID#. Although it is possible to use concatenated substrings as concept ID#s, it can be preferable to use shorter unique concept ID#s.

Each clear idea can then be assigned a text string that best defines it. And the set of paraphrases that mean the same concept can also be assigned to each concept.

To illustrate the process, consider the concept tree structure defined by a short text: "The contribution of a given non-$CO_2$ greenhouse gas to radiative forcing":

1. [Thecontributionofagiven non-$CO_2$greenhousegasTORadiativeForcing]
2. [The $*^{10}$ contributionofagivennon-$CO_2$greenhousegasTORadiativeForcing]
3. [The contributionofagiven non-$CO_2$greenhouse gas $*^9$ TORadiativeForcing]
4. [The contribution $*^8$ ofagivennon-$CO_2$greenhousegas TORadiativeForcing]
5. [The contribution of $*^7$ agivennon-$CO_2$greenhousegas TORadiativeForcing]
6. [The contribution of a $*^6$ givennon-$CO_2$greenhousegas TORadiativeForcing]
7. [The contribution of a given $*^5$ non-$CO_2$greenhousegas TORadiativeForcing]
8. [The contribution of a given non-$CO_2$ $*^4$ greenhousegas TORadiativeForcing]
9. [The contribution of a given non-$CO_2$ greenhousegas TO $*^3$ radiative forcing]
10. [The (contribution (of (a (given (non-$CO_2$ (greenhouse $*^2$ gas))))) TO (radiative $*^1$ forcing))]
11. "The contribution of a given non-$CO_2$ greenhouse gas to radiative forcing"

Line 11 is the original text. Line 10 models the tree structure taught by this text string in the form of substrings enclosed in nested parentheses, another often used method of modeling trees. The lines above successively concatenate text elements into longer substrings until just one long string remains. These increasingly long substrings name the increasingly complex concepts they represent. The small numbers in the tree above show the locations where concepts join, and also ID the root concept and each of its subconcepts individually.

Using such long concatenations of words as unique concept ID#s that label their underlying concepts is cumbersome. Thus, in certain embodiments, such long concatenations are replaced by simple unique identifiers, such as integers.

In FIG. 1, the concatenation of the above sentence is illustrated by replacing concatenated words, or concepts with an associated integer ID#. As can be seen, at the end of the process, the entire complex concept conveyed by the sentence has been reduced to a single concept identifiers, i.e., ID# 10. In the computer implemented systems and methods described herein, a database can be constructed that includes all the concepts included in the above sentence. This will consist of each of the individual lexical works or units, i.e., "contribution," "given," etc., the grammatical works, i.e., "to" and "of," and any punctuation. The operator can then start forming joins of the different individual or single concepts, such as "greenhouse gas," "to radiative forcing," etc. The joins will have their own entry or row in the database and will have their own unique identifier, or ID#. The joins will be successfully joined to form higher order concepts also with their own entry or reward ID# until the higher level concept, in this case ID# 10, is formed.

Thus, when the above sentence is input into the systems described herein, the parser program referred to can consult the database and make the joins illustrated above and in FIG. 1. Thus, the parser will eventually reach ID# 10 and will have identified the complex concept being conveyed.

As explained below a response or action can be associated with a concept in the database. Thus, once the complex concept is identified, the computer or processor can be instructed to take a certain action in response thereto. Further theory and examples are presented by way of explanation and background before specific embodiments and implementations are described in detail.

In the above example the unique concept ID#s were simply the text strings concatenated, which is somewhat unwieldy but perfectly functional numbering scheme and which has the advantage of making the related concept perfectly clear. One can easily see for example that concept 6 is named by "a given non-CO2 greenhouse gas," concept 3 by "to radiative forcing".

A naming rule can be defined in which the beginning word of the naming substring is the leaf node at the end of the path traversed by taking the left edge from each node. The last word of the string is at the end of the path created by taking the right edge from each node. This is the substring of leaves of the subtree that the node is the root node of One can see that this root node concept is the singular "meaning" of the text substring.

A concept, and concept tree, that is named by (n) terminal nodes, i.e., language elements, words and punctuation marks, will have approximately (2n) nodes in the binary tree that represents it. In this case the tree of 11 leaves and 10 join nodes taught by this text string will contain 21 concepts. Of course, trees with some nodes of higher valence will have fewer nodes.

Notice that covert boundaries will inevitably occur between adjacent language elements in a text string because one is the last terminal element of one branch and the next adjacent element is the first terminal element of the next and separate branch. In this case, very notably, between gas and to. A non-human parser cannot detect such a covert boundary without understanding the "meaning," i.e., which root node the substrings report to.

Figure 2:
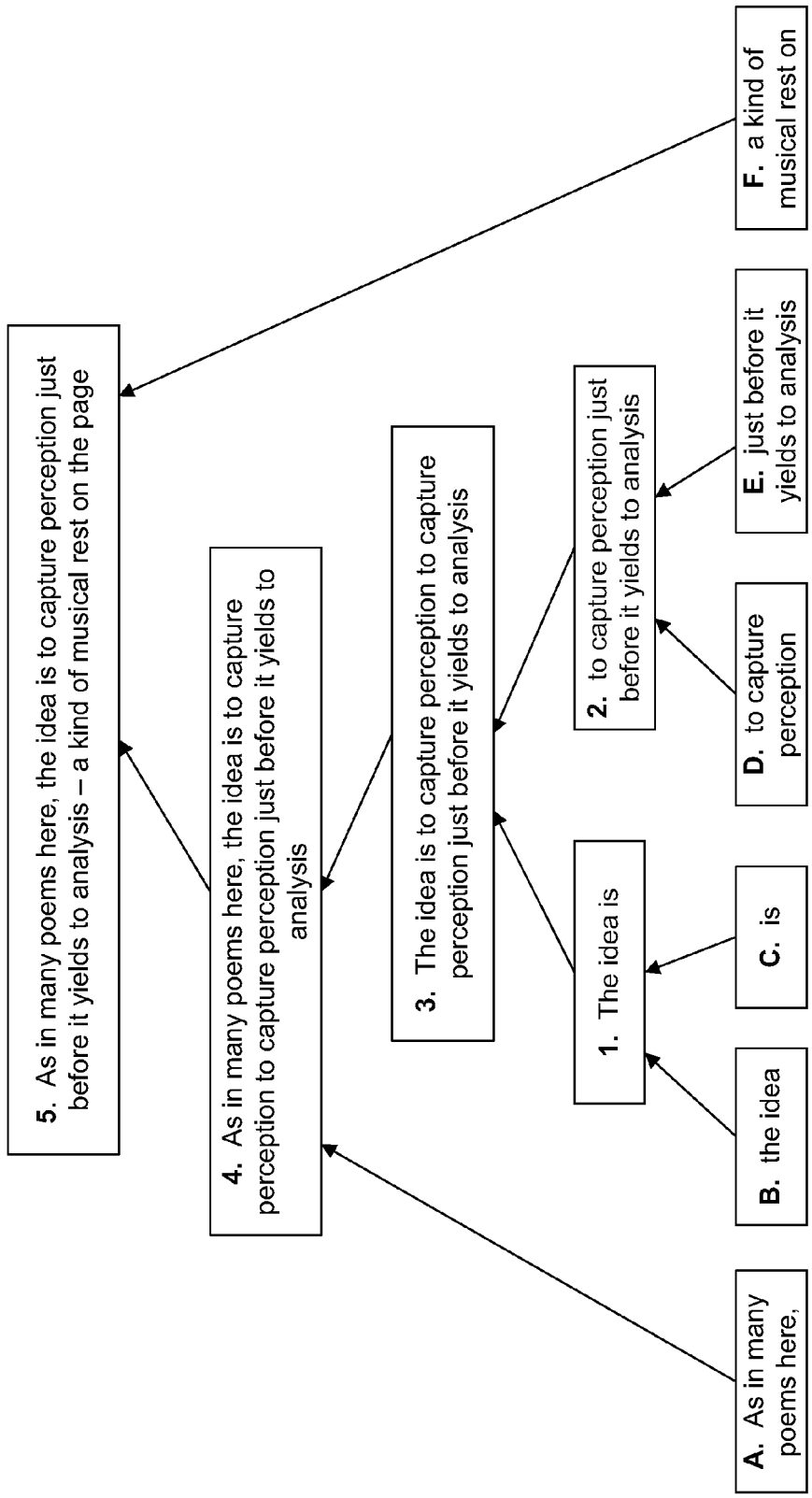
FIG. 2 is a diagram illustrating another example method for parsing a text string in accordance with one embodiment.

FIG. 2 is an example of a long sentence with a prepositional phrase, main clause, subordinate clause, and apposition. FIG. 2 further illustrates how complex concepts can be deduced using the joining process described above. The example sentence used is the following:

"As in many poems here, the idea is to capture perception just before it yields to analysis—a kind of musical rest on the page."

This finite sentence has 28 raw elements: lexical words, grammatical particles, and punctuation marks, the leaves of the tree, which divide into 6 bounded phrases that for this diagram have been pre-parsed to construct in turn subconcepts A, B, C, D, E and F illustrated in FIG. 2. These subconcepts can then be joined in strict order in 5 join steps 1-5 to construct the observation concept tree named by the entire finite sentence. In this example, concept B is the subject concept. The first join operation is to join it with concept C, the reality marker or seam concept, the observer's take on the reality of the observation, to construct concept 1. This concept can then be held while concept 2, the subject's complement is built from infinitive phrase subconcept D and subordinate clause concept E. The next join unites concepts 1 and 2 to form observation concept 3. This simple observation concept however will be adorned by adducing two more concepts to it. First, a join with concept A named by the initial phrase. Then a join of that whole complex concept with the apposition concept F to create the fully adorned observation concept 5, the root concept of the tree.

Keep in mind that, as with single text elements, phrases, subordinate clauses, apposition phrases, sentences, paragraphs, and larger structures must all be parsed down to single concept ID#s before final assembly. In the above example, it will be seen immediately that a non-human parser will have great difficulty in detecting the covert boundaries in the text that separate the phrases that describe sub-concepts A, B, C, D, E and F. As will been seen below, this difficulty can be resolved using a very simply and reliably process that uses a table of legal joins. Once subcomponent concepts, even if each is represented by a long text string, are reduced to a single concept ID#, they can be manipulated, merged, or put into special relations with each other.

The systems and methods described herein can enable bi-directional translation back and forth from the Fifth Medium database model to the Fourth Medium, language. The Fifth Medium, which although closer to language than any of the other media, is vitally different from language. This led to the development of the database table composed of join row records each with a proprietary set of fields, as briefly described above. Input programs to instill knowledge, processing programs to manage the knowledge, and input-output programs to retrieve knowledge in natural language and perform computer actions can then be used in conjunction with the database.

b. Concept ID Numbering Schemes

The systems and methods described herein can be used in conjunction with any schema for generating a unique concept ID# for each clear mental concept. Example schemes include: concatenating the words of the text string that names the clear mental concept to form a unique concept ID# for the concept; or concatenating the initials of the words of the text string that names the clear mental concept to form an initialism that becomes the unique concept ID# for the concept. With these schemes the concept ID#s evolve in complexity to reflect increasing complexity of the concepts they identify. Other concept ID numbering schemes are: generating a next accession number to be the unique concept ID# for the concept; letting a random number generator provide the next the unique concept ID# for the concept; using the domain address of the concept as the basis for a unique concept ID# for the concept; basing the unique concept ID# for the concept on the concept type; and using combinations of the above methods. Using domain locations for the concept ID#s has many advantages in that it makes intuitive the upfront assignment of the full end meaning to a concept, with optional Type 3 joins (see below) disclosing component concepts.

c. The Join Table

Using the systems and methods described herein, a relatively small set of join rows, as described herein, can precisely specify the structure of a complex mental concept by defining how its component concepts are joined to each other. Each join creates a join product idea made up of the two subcomponent ideas. Just as a text can define the structure of a complex mental concept, this set of join rows represents a complex concept and defines its precise structure. It is an alternate medium to text for holding the mental thoughts of an author. It matches the meaning of the original source text, or of unwritten thought. An M5 domain of knowledge contains many complex concepts each modeled by its own set of join rows. These sets of join rows are aggregated together into a table of join rows that models the whole domain of knowledge.

Thus, complex mental concepts specified by texts can be represented as a list or table of all legal joins between component concepts. In other words, a set of join rows describes and defines a data tree structure able to represent a complex mental concept, idea, or thought. In each join row two concepts, identified by their unique concept ID#s, are indicated to join together to produce a product concept, identified by its unique concept ID#. Each such join is defined in a row in a database table. Each join row of the table can hold the ID#s of the concepts that are joined to form a compound product concept and also the ID# of the compound product concept thus formed. Each row can represent a concept as does the unique ID# of the concept. Thus these rows could be called joins or could be called concepts. Knowledge organized in this alternate fashion, in M5, has values and properties quite different from the same knowledge stored as text because a computer or processor can understand the relations between the concepts, understands the place of any concept in the knowledge base.

To implement the join table, a new row or record is created in a database table for each individual idea, simple or complex. This row contains all the necessary information to uniquely identify the idea, specify its relationships with connected ideas, and can have a text field containing the language words, paraphrases, sentences, or paragraphs that language can use to identify and describe the idea or thought that the record represents.

Two important fields are the field that contains the ID#s of the two concepts that were joined to form the product concept, and the field that contains a concept ID# of the product concept. Other fields of the record can contain metadata useful for processing the table.

In certain embodiments, all joins that exist between the simple mental concepts can be listed first in the table. Then any joins between the product concepts of the first joins and still unjoined simple concepts. Then joins between pairs of compound concepts to form complex concepts can be added to the list. Then joins between complex concepts to form more complex concepts, and so on until the final join produces a single complex concept root node that represents the structured concept and all of its component concepts in their place. It is important that no illegal joins are listed in the join row table.

The purpose of the paragraph-sentence-line/order column is that it imposes a tree structure on the whole M5 knowledge domain, allowing concepts to take their place in the domain in a logical and convenient manner. Like a language text, a domain of knowledge in M5 can be divided into numbered observation concepts and paragraph concepts, which are ordered in the manner of written text. So every join row is marked by values in a special order field/column of the concept record as to which observation and paragraph concept that idea is party to. This proves useful when creating the database, for keeping concepts in an organized structure, and for sorting of the database table back into order or into some useful new order. It also provides a place for insertion of new concepts into the exact observation concepts and context where they apply. This order column is also important in enabling ancillary software programs to be aware of context, by searching the database for local concepts when settling on which concept, say, a personal pronoun is referring to. This is a powerful function for resolving ambiguity, allowing ancillary programs to operate at a truly human level in understanding text inputs.

For convenience in the same table, there can also be a text field/column for vocabulary words and punctuation marks, which links each such text element to its concept number. These concepts can be considered the simple unjoined atomic concepts and since they are not joined to another concept in the row the product concept is the same concept itself.

There can optionally be a row that lists concept ID#s of all the concepts that the concept of that row is a member of, necessary for the intersection method of parsing.

Accordingly, just as in the mind, a complex concept is composed of a large number of clear concepts related to each other precisely, i.e., the structures of concept ID#s are joined to concept ID#s to form more complex concept ID# constructions. Then concept ID#s of more complex concepts are joined to represent even more complex concepts. And so on recursively to finally represent a unitary complex concept construct that holds all of its component concepts in a particular structure.

FIG. 3 is a screenshot illustrating an exemplary Fifth Medium working database table that enables a parsing program to derive the concept ID# DBHAN? from the input string question "Does Batman have a nemesis?" Thus, the example also illustrates a method of using acronyms or initialisms to create unique concept ID#s.

The above table rows or records form a tree structure for concept DBHAN? in the following way: the "Vocab" column of each row contains each lexical word or unit, a grammatical word, or punctuation mark of the input text. In this case, these elements are in rows 174-179. The Lookup field contains the pair of concepts that join to make up the concept represented by that row with the ~ representing the join symbol. The concept field contains the concept ID# of the concept. The response field contains the concept ID# of the row in the table that represents the response concept, in effect a pointer to that row. The text field contains the text that best describes the concept of the row.

It will be seen that the set of 11 rows, 174-186, define a tree. Concept DBAN? that has edges of DBHAN and ?. ? is a leaf node of the tree. DBHAN has edges of concepts Does and BHAN. Does is a leaf concept. BHAN is adjacent to Batman and HAN. Batman is a leaf concept. HAN is made up of Have and AN. Have is a lexical leaf concept. AN points to A and Nemesis. A is a grammatical leaf and nemesis a lexical leaf. This is a directed binary graph in Graph Theory. YTJ is a response concept, which can, e.g., cause an enable computer to output the text "Yes, The Joker."

Concept DBHAN? is represented in Fifth Medium by the tree defined by the set of the 11 rows 174-186, by row 186 alone and by concept ID# DBHAN? alone. Of course, the text string "Does Batman have a nemesis?" also represents this concept, but in Fourth Medium.

As can also be seen, join-rows can have a response field containing pointers to rows that represent actions computer is capable of taking Row 187 is such a response row, pointed to from rows 185 and 186. It contains in its Text field the text "Yes, the Joker," which would be output when concept row 186 was found by parsing the input question "Does Batman have a nemesis?"

In the databases, each concept record or join row can have a unique ID# and pointers to ID#s of other conceptually related rows, which in turn have pointers to other conceptually related records, enabling a particular set of linked records to form a proprietary tree structure able to model collectively any particular human thought in all its detail. Besides its ID#, each join row can contain the ID#s of the pair of mental concepts that were joined to make it, each represented by their own row in the database, as well as the set of ID#s of the more complex concepts that this concept is or can be a component of, again each represented by their own row in the database.

Each component row of the tree represents one of the subcomponent concepts that make up the complex concept. And the pointers specify that subconcept's exact place in the complex concept structure. This related set of rows in the database can model a complex mental concept in acute detail. For each such concept tree there is a root record that can stand in for its entire tree concept, whose unique ID# identifies and names the unique mental concept that that tree of records represents. Thereby, a complex concept can be represented in the database by this tree structure, or by a single row, or by an ID#.

Since human thought models (noun) entities, (verb) states, events, and actions and the (seam) relations between them in the real present world around us or in some imaginary world, metadata fields can be added to the records to specify whether they represents something real in the present, past, or in the future or something imaginary, in the present, past, or in the future. Concept records have other fields containing specifiers of various other properties of the mental concept they represent, such as which media is host to the concept, whose mind it is being held in, or in what text corpus, whether written or audio, its concept type, and any other property useful for the computer program to make use of when processing it.

The system models how the mind actively joined two concepts to encode a more complex concept in memory. This mental process is an observation concept, which will be described at length below; however, once a join is made the mind considers the product concept a unitary concept that can engage in new further joins, and so on to create a labeled directed binary tree specified by a list of joins between concept ID#s of adjacent subcomponent ideas.

d. Types of Join

Four kinds of join-rows: Type 1, Type 2, Type 3, and Type 4 can be implemented. Joins are restrictive or non-restrictive depending on whether they restrict the scope of the concept or add more information. They can be neither if they leave the concept precisely the same.

In a Type 1 join a concept is enriched by the addition of an attribute or feature concept to produce an enriched concept that has the same base nature as the original concept, but is more differentiated. These we called product concepts. Examples are noun concepts enriched by adjective concepts and verb concepts enriched by adverb concepts. The product concept can be an essential variant of the original concept, where the concept changes its essence, or an accidental variant of the original concept, where the concept does not change its essence but is temporarily in a different state, most often reversible. These are BE type joins which are directed to be created by sentences using the verb "be." In Spanish the verb "ser" directs the construction of an essential variant product that is permanent and the verb "estar" the construction of an accidental variant product that is temporary.

Tall~tree=talltree "the tree is tall" (ser)

Idling~engine=idlingengine "the engine is idling" (estar)

This is the same dichotomy as restrictive and non-restrictive.

In a Type 2 join, two concepts fuse to form a product concept where the surviving concept is not in the nature of either of its parts. And example would be a join between two individual tennis players to form a doubles pair. For example:

Peer~peer=pair.

Most concepts used to construct an observation concept are built by adding subconcepts with Type 1 and Type 2 joins. This is bottom up concept construction; each new subconcept addition changes the meaning of the growing complex concept.

In a Type 3 join a component concept is joined to the higher order concept that it is a part of, one that already contains the component. So this higher order concept is not changed by the join. The product concept is the higher order concept and therefore has the same concept ID#. For example:

Whole~part=whole

The following is an example of Type 3 join rows that join two apposition concepts to a higher order concept to produce the same enriched higher order concept that is already comprised to the two appositions:

Venus~themorningstar=Venus
Venus~theeveningstar=Venus

Group concepts are built with Type 3 joins. This is top down concept construction. The full meaning of the observation concept is already there with all concepts already in place. Type 3 joins are essential for building paragraph, observation, and appositions types of group concept. Punctuation marks indicate that this type of join is to be employed to join the concept defined just before the punctuation mark onto the higher order group concept being constructed.

To illustrate the importance of Type 3 join rows lets analyze the process of constructing the verb concept of the observation concept sourced from the following finite sentence:

"a horse will widen its eyes, flare its nostrils, and send a stuttering column of air out into the world"
which can also be said, in a data compressed manner:
"a horse will snort"

clearly the word string "widen its eyes, flare its nostrils, and send a stuttering column of air out into the world" is the dictionary definition of verb "snort".

In one example implementation, the process of translating this verb phrase into an M5 verb concept, SNORT, is as follows: "snort" becomes concept SNORT, "widen its eyes" becomes concept WIE, "flare its nostrils" becomes concept FIN, "send a stuttering column of air out into the world" becomes SASCOAOITW.

The comma after "widen its eyes" says to make a Type 3 join row:

WIE~,=WIE

The comma after "flare its nostrils" says to make a Type 3 join row:

FIN~,=FIN

The "and" before "send a stuttering column of air out into the world" says to make a Type 3 join row:

and~SASCOAOITW=SNORT

For the sake of enabling a parser to parse the punctuation marks and the "and" we need the following row as well:

SNORT~SNORT=SNORT

This is a Type 4 join row, which is sometimes required for the parser to complete the parse of a text. For example:

WHOLE~WHOLE=WHOLE

Figure 4:
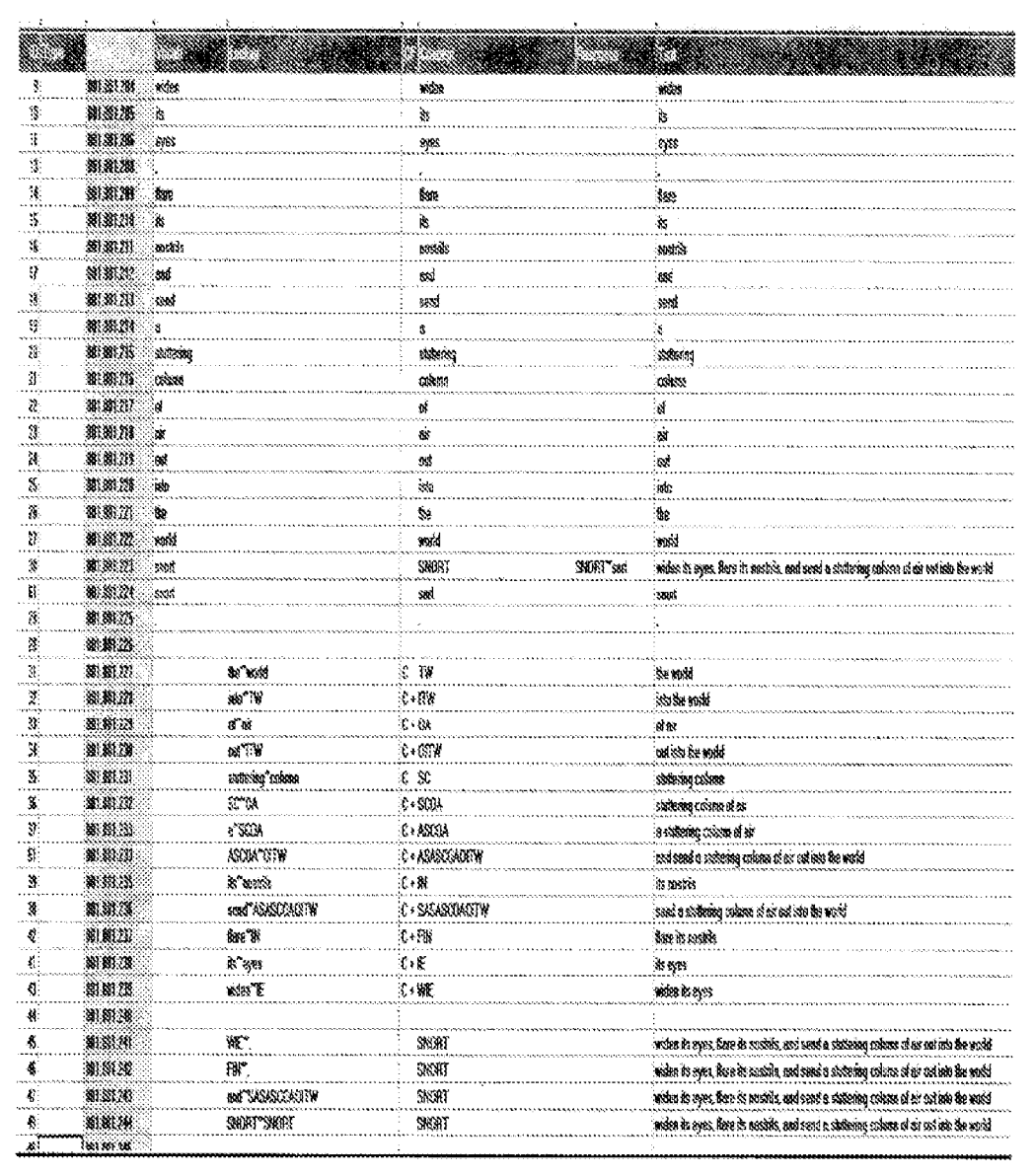

FIG. 4 is an example database table for the above sentence:

e. Basic Concept Types i. Entity or Noun Type Concepts

Entity concepts are an important type of concept that represent entities in contrast to verb phrase concepts, which represent states of being, events, and actions. In regular grammatical theory they would be considered a noun phrase (NP) concept with the noun as its "head", which according to current linguistic theories, are pre-modified by articles "a" or "the," or by adjectives, and post-modified by prepositional phrases or clauses. In M5, the article is the core concept being enriched by the noun and other concepts of the noun phrase. Noun phrase concepts can have person, number, and gender qualities. Thus, personal pronoun concepts can be complete noun phrase concepts.

Join rows can be used to represent noun phrase concepts in the following manner: Start with an article concept that has the same meaning as concept it:

the~house=thehouse

Thus, the concept the enriched by concept house, i.e., thehouse, is still an it concept, not a "house" concept, the concept house can be enriched by other concepts to produce, e.g., concept:

big~house=bighouse

Here, the concept the enriched by concept bighouse is still an it concept:

the~bighouse=thebighouse

Besides the article concepts a an the and the -s plural inflection of noun, which has the same meaning as personal pronoun concept they, an entity concept core concepts can be personal pronoun concepts (he, you), demonstrative concepts (this, that) numerals (four, seven), quantifiers (some, many), possessives (my, their, Harry's), possessive pronouns (mine, his, yours), and concepts like somebody, anyone, infinitive concepts and gerund concepts, that clause concepts and relative clause concepts. All subject concepts are noun phrase concepts by definition.

There are two types of clear concept that can be added to entity concepts to enrich their total conceptual content, complement concepts that are restrictive and apposition concepts that are non-restrictive.

ii. Apposition Concepts

Apposition concepts, normally named by noun phrases, are often joined with a first noun phrase concept to enrich it. Concepts that enrich other concepts like noun phrase concepts are said to be "restrictive" when they narrow the scope of the concept to a particular example or subset and "non-restrictive" when they simply add more information about the subject. In M5, apposition concepts are non-restrictive and when an enriching concept is restrictive we call it a complement concept. (See below).

For example a books title, its subtitle, author, page #, press, and price form a typical appositions group concept:

IN DEFENSE OF FOOD
An Eater's Manifesto
By Michael Pollan
244 pages. The Penguin Press. $21.95.

These apposition concepts are non-restrictive. They do not change the scope of the book concept but simply add more information about it.

It is extremely common for the subject concept of an observation to take the form of a group concept comprised of a first concept followed by one or more apposition concepts; for example, "Venus, the morning star, the evening star, is the second planet from the sun".

To construct this appositions concept in M5, the following Type 3 join rows are required:

Venus~, =Venus
themorningstar~,=themorningstar
theeveningstar~,=theeveningstar
Venus~themorningstar=Venus
Venus~theeveningstar=Venus Notice that these rows imply the following verb BE sentences: "Venus is the morning star" and Venus is the evening star." Once the statement is made questions arise like "Is Venus the evening star?," "Is Venus a planet?," "Is the evening star a planet?," etc. It is the responsibility of the M5 composer to decide how far he must go in adding extra join rows to cover obvious implications like these. But methods of M5 allow as many as needed.

iii. Complement Concepts

As opposed to apposition concepts, complement concepts are restrictive; they narrow the scope of the original concept that they modify. For example, concept wine is narrowed by becoming redwine when complement concept red is added to it. An important type of complement concept are niche concepts which are formed by proximity or association with another clear concept.

iv. Grammaticals That Form Niche Concepts

Whenever a concept is brought into relation with another it changes its meaning so as to adapt to its new environment. One can think of this as it receiving added conceptual content from its new situation. This new situation the concept is in can be thought of as a niche or role for the concept to occupy, a niche that has the power to transfer certain modifying conceptual content to the incumbent concept.

In the expression "members of the committee," the concept ofthecommittee, although it comes after the noun phrase, functions like an adjective to enrich concept members. The expression can be paraphrased as "committee members" where "committee" changes its meaning from noun to adjective because it is in adjective position before the noun.

The necessary Type 1 join rows to construct these concepts in M5 are:
    the~comittee=thecomittee
    of~thecomittee=ofthecomittee
    members—ofthecomittee=membersofthecomittee
    committee~members=membersofthecomittee In this case the conceptual content added to the members in restrictive; particular members are meant.

The phrase "heavy as lead" is illustrative of some principles. Here new conceptual content is being added to concept heavy. Here are the join rows that construct this concept:
    as~lead=aslead
    heavy~aslead=heavyaslead As with of above, the conceptual content transferred is carried by grammatical concept as, which picked it up from its neighbor concept lead. This example highlights the need to use the human mind to figure out exactly what particular conceptual content as extracted from concept lead and transferred to concept heavy, an impossible task for present day computers. Herein, concepts, whatever they mean to a human mind, are recorded by assigning unique concept ID#s that identify them, plus matching text so humans know what they mean.

For example, in the expression "the book on the table" the prepositional phrase "on the table" describes the niche concept onthetable, which has thebook as its incumbent concept. In the niche concept thebook adapts its meaning by adding new conceptual content to fit its new situation. A concept changing its meaning in a niche is exactly parallel to a word having a different meaning in each different context.

Niches in complex concepts are concepts in their own right and are given concept ID#s just like other concepts. And there is no practical difference between the niche and the conceptual content it has the power to transfer to its incumbent concept, to the extent that they can share the same concept ID#.

The necessary Type 1 join rows to construct these concepts in M5 are:
    the~table=thetable
    1under~thetable=underthetable (the niche concept)
    the~book=thebook
    thebook~underthetable=thebookunderthetable In other words, language makes use of grammaticals to pick up the conceptual content being transferred, i.e., grammatical concept on picks up meaning from its relative concept thetable and transfers it to thebook. If the expression were "the book under the table," grammatical concept under would pick up different meaning from its relative thetable and transfer it to thebook. Each grammaticals is specific in what kind of information it gathers and transfers. This is how prepositions function.

In this case, the conceptual content added to the book is non-restrictive. The book is still the same book; just more information about it has been added to it.

A subject concept in an observation is in a similar niche. Being a subject of an observation will transfer conceptual content to the subject. For example, consider the sentence "John walks to the store." Here concept John receives conceptual content from being in the subject niche of this observation. The word "walking" names the concept conceptual content walking that is added to concept John. Just like on and under above, verb inflection -ing, acting like a grammatical, picks up conceptual content from its neighbor verb concept walk and transfers it to the subject concept John. Once walking is seen as a concept like any other it can be an a noun concept, i.e., a gerund, as in "walking is good for you" or an adjective concept, i.e., as in "walking stick." Counterintuitively, in the systems and methods described herein, walking is not a verb concept but rather a BE (see below) type relative concept in an observation.

Language makes very extensive use of grammaticals to pick up meaning from niches in complex concept to transfer to another concept. The roles in an observation concept are probably the most important kind of niche concept. The very important grammatical that extracts meaning from observation niches is that. That always picks up its conceptual content from an observation. The other grammaticals that work with niches of observation concepts are the relative/interrogative pronouns what, who, whom, when, where, how, and why.

Concept that is able to extract the conceptual content that a concept would acquire from being in an observation concept niche and add it to another concept, acting like an adjective. In expressions like "the book that I bought last week" grammatical that, just like in and under above, picks up conceptual content from the verb object niche the book was incumbent in in the observation described by the sentence "I bought a book last week."

If the sentence parses to concept Iboughtabooklastweek then the join row required to capture the conceptual content, that23, transferred to the book is:
    that~Iboughtabooklastweek=that23

In a particular context "that" has exactly the same meaning as the longer expression "that I bought last week" and can by itself alone act like an adjective as in the expression "that book". Concept that is acting like an adjective when bringing conceptual content to the book. Thus, grammaticals can be thought of as holding the total meaning of the full prepositional or that phrase, acting like a personal pronoun holding the full meaning of its referent concept.

For another example, take the sentence "one gets a certain feeling when the weather is beautiful". The concept certainfeeling obtains a special meaning from being a verb object component concept of the weather observation. So, in the expression "the certain feeling that one gets when the weather is beautiful" the concept that one gets when the weather is beautiful adds this extracted meaning to concept certainfeeling. Just like an adjective. If someone said "I know that feeling," with that in adjective position that's meaning is clearly the same as the longer expression.

This line of thought makes clear the long debated difference between which and that in expressions like "the book that I bought last week" and "the book, which I bought last week." That-expressions are restrictive; which-expressions are non-restrictive.

While that extracts conceptual content from the niches of an observation concept, the relative/interrogative pronouns work in a very similar manner with observation niches. Relative pronouns what, who, whom, when, where, how, and why are used to refer to incumbent concepts currently in the roles of an observation, without identifying them. These relative/interrogative pronouns are all deictics that do stand for different concepts in different contexts, exactly like the personal pronoun grammaticals do.

Concepts can be identified by their incumbency in an observation niche role. Interestingly, while what, who, whom, when, where, how, and why refer to defined incumbent concepts without naming them explicitly, whatever, whoever, whomever, whenever, wherever, however, and whyever refer to as yet undefined occupant concepts of observation niches.

For example, in the Rumpole stories the expression "she who must be obeyed" famously refers to Rumpole's wife Hilda without explicitly using her name. The base observation concept is Hildamustbeobeyed, which is the same concept as shemustbeobeyed, which is the same concept as whomustbeobeyed. Hilda and she and who are the same subject concept occupying the subject niche of the observation. But if we want to extract conceptual content from the subject niche to enrich another concept we use that instead of she to get niche concept thatmustbeobeyed, as in "a wife that must be obeyed".

v. Verb Phrase Concepts

A verb is a word that means an action (bring, read), an event (decompose, glitter), or a state of being (exist, stand). Verb concepts have sensory patterns that are readily recognizable to human observers: walk, run, jump, think, etc. They are states and events, processes and actions, more intangible than entities and things. Their concept structure is a base verb concept enriched by adverbial complement and apposition concepts just like entity concepts are enriched by adjectival concepts. Verb concepts are enriched by all the subconcepts that are asserted onto it, each one adding to its meaning. They particularly gain conceptual enrichment by their proximity to a subject or object concept described by the syntactical subject or object of a sentence. In any case a complex verb phrase concept is constructed with a series of join rows in exactly the same manner as other concepts and gets a unique concept ID# assigned.

vi. The Observation Concept

Here is how language approaches representing a domain of knowledge: to cover a domain of knowledge a writer or speaker reports a series of sensings that he has made on that knowledge domain, each time picking a subject concept in the knowledge domain and seeing what other concepts are in relation to it and what the relationship is. So his opus consists of descriptions of a carefully chosen series of samplings, i.e., sensings (sentences), observations, of the knowledge domain. And it is remarkable how a good writer can paint a very rich picture of a knowledge domain for the second person with just 40 to 50 observations grouped in 10 or so paragraphs. A different observer can choose a different set of samplings of the knowledge domain and still capture an accurate and rich picture of the knowledge.

Making observations, having a train of thoughts, is the key operation of the human mind. Recording those thoughts is the key operation of natural language. Constructing observation concepts that match those thoughts is the key operation of the systems and methods described herein. They are entirely parallel operations dealing with the same conceptual content.

The observation concept is by far the most important complex concept and it is essential, if observations are to be modeled in a computer as herein, to analyze, and understand, how one is built up from its component concepts.

And the concept constructed by the observation will precisely model a state, event, or action out there in the world or in an imaginary world.

An observation concept represents a state when the observer has time to examine a point in the real or imaginary world and then see what he sees, i.e., all of the ancillary concepts that are related there forming a recognizable sensory pattern. This is observer driven construction of a state observation concept.

An observation concept represents an event when it happens in front of an observer. The event drives construction of the observation concept in the observer's mind. The observer's attention is caught by sensory patterns, i.e., concepts, showing up. He may have a situation. He has to make sense of the pattern, via a sensing. He has to relate them to each other and to see if they can be composed into a recognizable pattern already known to him that may have meaning in a larger context, tell him what's going on. To be able to see untoward concept patterns, foresee problems, and start measures to avert them is a survival skill highly selected for in human evolution.

An observation concept represents an action when the observer/actor first imagines what he will see if he takes an action, takes the action, and realizes what he imagined. Here the observer drives the construction of the observation concept in his mind. Sometimes the subject just catches his notice and he sees what he sees, not observer driven state concept construction.

To make an observation an observer looks into his memory, or he can look out onto the real world about him, or he can study a spreadsheet or graphic, or he can read text or listen to speech, or he can interrogate the database model described herein. He can equally well explore any one of the five media, because they modeling the same reality or knowledge, seeing the same group of related concepts.

Here are the mechanics of an observation. To see how things are, we focus our mind's eye on a point in our memory, or focus the real eyes on or look at a subject in the outside world. A subject can be anything, a tree, a house, an idea, an argument, that can be described by a noun phrase. We observe what other concepts are related to that subject and therefore to each other. The goal of an observation is to make sense of the group of concepts seen at a particular point, to develop a coherent observation concept structure for them to fit together into. Once observed, the complex exists as a concept, so do its parts, and so the relations between its parts.

An observation is an active operation of the mind where an observer, looking and then seeing, determines the way things are at that particular point and at that particular moment. It is the only part of declarative knowledge that evokes consciousness. Other higher order mental operations are unconscious and automatic.

This action by an observer is an observation, a real event in itself. It is how the mind models a state, an event, or an action and the concept complex constructed in his mind is an observation concept. Observation concepts are the thoughts, active ideas that a mind has with consciousness involved. Sometimes the observer constructs the observation concept by examination of the world. Sometimes what happens out there drives the modeling in the observer's mind as he watches it take place.

And of course the process is often recursive. Many times a first observer is watching or recording an observation made by a second observer. When a first observer takes an action it is an event for the second observer watching. However he types it is an action by the first observer. Also an observation concept is often the subject parapoint of another observation or the object concept of a verb.

The mental process of an observation can be described precisely by language as a finite sentence. Finite sentences are the missives humans use to communicate with each other, to transmit or publish declarative knowledge, to describe a state, an event or an action. Finite sentences say something. Expressions just name things.

Finite sentences are the messages from one human mind to another. A finite sentence is an instruction by the first person to the second person to join several specified component concepts together at a single point to form a complex, to "make a point." When an observer declares he is looking at and seeing concepts relating to each other at a point, he is indicating he sees the concepts bound together to form a complex concept. It is noteworthy that a finite sentence is not just a text string naming a complex concept. To be a finite sentence a text string has to say something. Each finite sentence specifies relations between certain concepts and has to have an observer's mark on it indicating his estimate of its truth and reality.

What makes a word string be a finite sentence syntactically is well understood by linguists. The syntactical parameters of person, number, gender, voice, tense, reality/mood, affirmation/negation, modality, finitivity, time, place, causality, and manner are encoded in a finite sentence.

Once the basic relation between subject concept and relative concept has been defined, many finite sentences add metadata concepts that shade the meaning, add circumstances and conditions, explicate the observer and his attitude to the relation the has declared to remarkable degrees of sophistication. These metadata concepts joined to the core observation can be thought of non-restrictive additional information about the observation. They are usually described by text strings coming before the first comma of the finite sentence or after the last comma.

The core of every observation concept in the systems and methods described herein is a triad comprised of three main component concepts: a subject concept, a seam concept and a relative concept. Optionally there may be a pre-modifier concept(s), which are common, and a post-modifier concept(s), which are less common.

Figure 5:
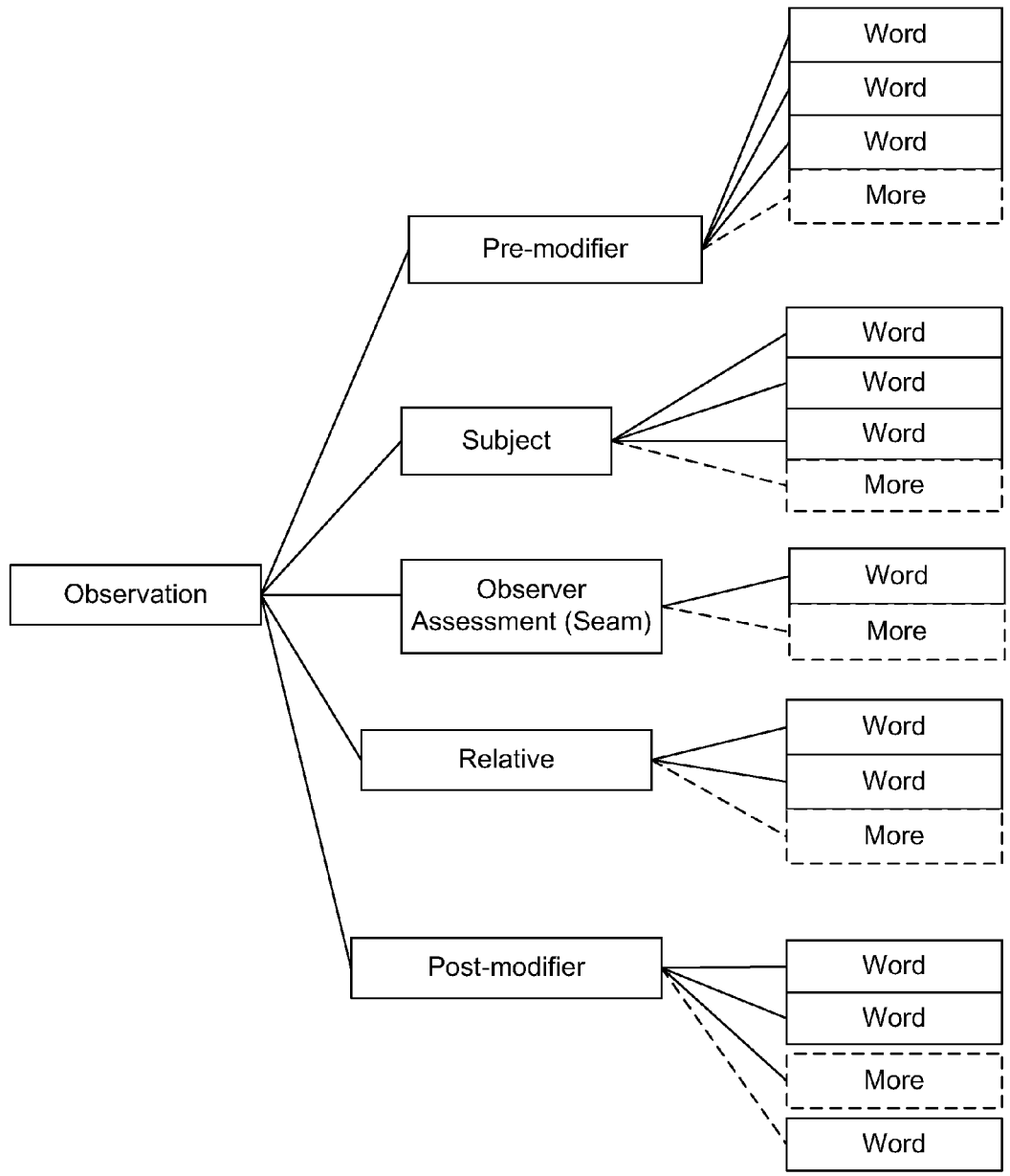
FIG. 5 is a tree diagram illustrating the structure of a observation concept that can be modeled using the table of FIG. 3.

In an English finite sentence the word strings that name these three components are discrete, have hidden boundaries between them and appear in subject/seam/relative order as shown in FIG. 5, which shows the tree diagram of an observation complex, The order can be reversed for poetic effect in certain finite sentences. Finite sentences sometimes run up to 100 words yet they are still comprised of the same five standard building blocks: the triad concept: subjectseamrelative, plus one or more modifiers.

Here are some example finite sentences with strings split into these component parts:

He (subject) is (seam) a baker(relative)

Harry (subject) still has (seam) many good friends (relative)

He (subject) does (seam) bake good pastries (relative)

But (modifier) the accessible Dalai Lama, whose voice can be downloaded as a ring tone and who crisscrosses the globe with a populist message of compassion and kindness, (subject) is only (seam) a part of who he is (relative).

He (subject) is mostly, and radically, (seam) a private man (relative).

It's easy to forget, given the sensitivities that have been awakened in this country since 9/11, thrusting lifelong citizens under suspicion for having foreign-sounding names and subjecting visitors to the indignity of being fingerprinted, that (modifier) America (subject) was (seam) conceived in a spirit of openness, as a land where people could build new identities, grounded in the present and the future, not the past (relative).

In this last sentence the long pre-modifier expression is putting a very subtle spin on the main clause; however, creating the sets of M5 join rows that can define the structure of this modifier concept is straightforward. Then, once represented by single concept ID#s, it can be joined in to the whole observation concept structure.

Detecting the mostly unmarked borders that separate these strings that describe the triad can sometimes tax even a human parser. However, no matter how convoluted the sentence, no matter how many subordinate clauses decorate these concepts, it is a simple task for a parser program that has the help of a join row table.

In parsing a finite sentence it is imperative that the parser, when about to read a sentence, knows that he will be apprised of a triad of subject, seam, and relative in that order. First a subject concept will be disclosed and this subject will be in a specified seam relation to a relative concept to be disclosed. Then other information about the observation can be added with comma separated pre- and post-modifier phrases, which parse to single concept ID#s.

In other words, he will be told the subject and then immediately told what kind of relation it will be plus the observer's assessment of that relation, and then told the relative. Next, other information about the observation can be added with comma separated pre-modifier and post-modifier phrases.

The subject and relative concepts of an observation may be quite complex in their own right and have to be prebuilt and assigned a concept ID# up front, the same concept ID# that would be obtained by parsing the subject and relative text strings of the finite sentence.

Subject concepts are always entity concepts. Very long and recursive text strings are often used to describe subject concepts yet an M5 parser, with the help of an M5 join table, is able to parse the string to a single concept ID# of that expression no matter how long or convoluted the string is.

A seam concept is a specialized cluster of parameters encoded in every finite sentence that make the sentence a finite sentence. They define the relationship between the subject concept and the relative concept plus the observer's take on the "reality" of the relation. Seam concepts are specified in language by a specialized grammatical particle or a short string of specialized grammaticals, or a verb inflection, embedded in the finite sentence.

Language has several techniques for encoding seams in finite sentences, which have to be decoded by the second person: the seam concept can be included in the grammatical particles is, am, are, was, were, has, have, had, does, do, did, can, could, may, might, will, would, shall, should, must, dare, and used to. Has to can optionally be treated as one of these. These grammaticals carry the observer's reality stamp and the type of relation featured in this observation. Interestingly, there is no overlap of this group with the other elements of language except for will and can, which are also lexicals. For this reason they are excellent markers of the end of the subject phrase.

These special grammaticals carry the world parameter, which indicates whether the observer is seeing the relation between subject and relative in his real present world or in some imaginary or memory world. In English, the past is treated as a memory world. For example is and can indicate present real world, was and could memory world.

An affirmation/negation parameter: affirmative is default, or never concepts are used to indicate negation. Seam concepts can be modified by concepts like always, only, still, ever, forever, seldom, initially, and usually. Seam concepts can be constructed in exactly the same manner as other concept with join rows. For example:

was—not=wasnot
wasnot~always=wasnotalways
wasnot—still=wasnotstill
wasnot~ever=wasnotever In any case the text string of the seam will parse to a single seam concept ID#, which is used in join rows along with the subject and relative concepts to build an observation concept.

Then the observer-assessment parameter also defines which of the three types of relationship will apply in this observation, a BE, HAVE, or DO relationship. Let's define them: a BE relationship occurs when the relative is an adjective type complement or apposition type concept, to be joined to the subject concept to enrich it. A HAVE relationship occurs when the relative is a neighbor noun entity type concept. A DO relationship occurs when the relative is a verb phrase type concept.

The modality parameter: the seam concept also carries modality. Like do, modals can, will, may, shall, and always relate to a verb type relative. Does says the observer sees that the relation exists. Can says observer assesses it's reality as possible, may says there it's a probability, will says it's certain in the observer's mental computation, shall says the observer will make sure it's real, must says it's necessary.

Very often the the seam is not found on one of the separate grammatical particles listed above but rather is encoded as the -s or -d inflection of the lexical verb in a predicate.

As well as giving the relation a quality of existence, existence "percolates" into to many of the accessory concepts of the observation concept. The subject concept becomes real and so do component concept used in the construction of the subject and verb concept.

The seam is the way language confers degrees of reality on states of being, events, and actions. The seam is how language confers degrees of reality on concepts and distinguishes reality from memory and the imagination.

Carrying reality, affirmation/negation, modality, voice, tense, aspect, finitivity, the seam is what makes a finite sentence a finite sentence.

There are three types of relative concepts, BE, HAVE, and DO types, which have their own characteristic features. They are concept-enriching concepts, which may be restrictive or non-restrictive.

Concept Enriching Concepts (BE type) are Complement concepts and Apposition concepts.

Neighbor (Noun) concepts (HAVE type): This type of relative concept is related to the subject concept by a have type seam. Interestingly, subject concepts are enriched by an entity relative via a have seam. Take the sentence "Jim has a son," which describes observation concept. Jim (subject) has (seam) a son (relative). A man who has a son is a parent. The added conceptual content he receives, the niche concept he gets from occupying the subject niche of this observation is the, a parent, apposition concept.

Verb Phrase concepts (DO type): The verb concept is the third type of relative concept. Subject concepts are enriched by a do seam relating a verb relative in a similar manner to enrichment by have seams relating a noun relative.

Pre- and post-modifiers, whose descriptor strings are set off by a comma in finite sentences, are used to provide important metadata, setting the context, background, circumstance, situation, milieu, environment, perspective, or framework of the observation. Some disclose who says, thinks, notices, or believes it. Some disclose under what conditions is it true. Others turn it into a quotation, a question, or an exclamation. They indicate how the observer sees or saw the relationship between the subject and the other concepts involved. It declares the newly formed complex concept and its parts to exist or not exist as the case may be; this quality of existence "percolates" into to many of the accessory concepts of the observation concept, its world, reality, and modality.

Language uses many wonderful and subtle means to frame observations. Modifiers come in all shapes and sizes but all can be managed by parsing their strings to a single concept ID# and making a join row join it to the observation concept. These modifier concepts add enormous versatility to an observation.

Figure 6:
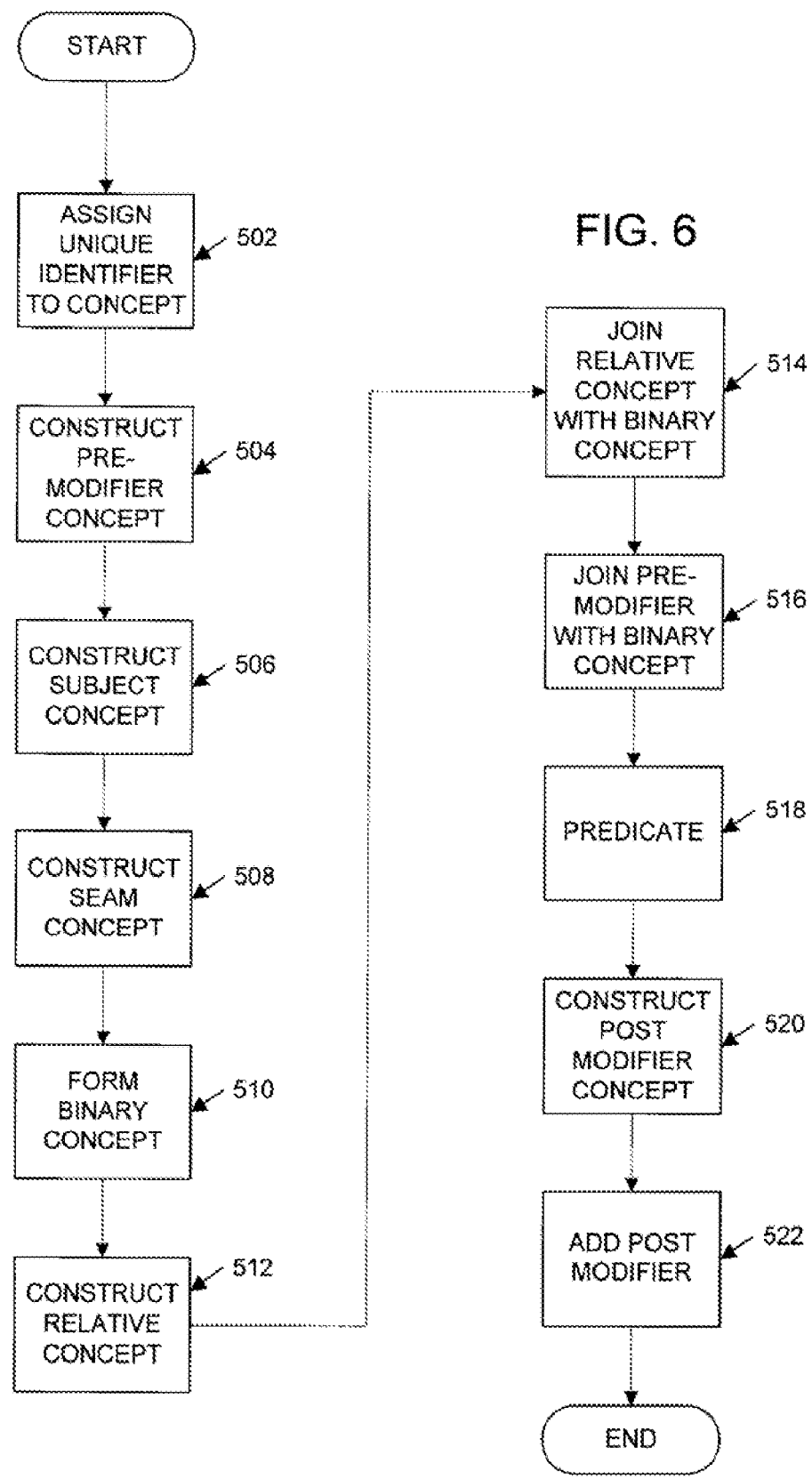
FIG. 6 is a flow chart illustrating an example method for parsing a text string using the table of FIG. 3 in accordance with one embodiment.

Generally, a composer who understands the meaning of sentences directs the process of building concepts in the database. An observation concept can be built in M5 with a series of join rows as described above. Triadconcepts fall into three formal types and play standard roles in an observation. It makes sense that a finite sentence delivers them to the second person in an expected order. The seam source text is usually one to three grammatical particles. FIG. 6 is a flow chart illustrating an example process for constructing an observation concept in accordance with our embodiment.

First, in step 502, a unique concept ID# can be assigned to the observation concept being built. This step can be performed up front at the beginning of the process. The ID# can stand for the complete and final meaning of the observation from the outset. In certain embodiments, the observation concept ID#s can be generated using a domain location numbering schema. But as mentioned, other schemes can be used as well.

In step 504, a pre-modifier concept, if present, can be constructed. For example, the pre-modifier concept can be built and assigned a concept ID# so it can in turn be joined into the overall observation concept with a single Type 3 join row. Pre-modifier concepts are extremely various and versatile as discussed in more detail above.

Next, the main triad of observation can be constructed by connecting together the three triad concepts with appropriate join rows. We have coined the term xxx for triad concepts that are directly joined to the point of the observation. Thus, the subject concept can be built in step 506 and the seam concept can be built in step 508. In step 510, the first join is between the subject concept and the seam concept can be performed in order to form a binary concept.

The next concept to be joined on to this binary concept is the relative concept, which can be built in step 512 and joined in step 514. Like the subject concept, the relative concept can be pre-built and given a concept ID# so it can be joined in to the observation with a single join row.

The predicate, step 518, is a special case. The lexical verb of a predicate already carries the entire seam parameter and the basic verb concept bundled together. In a predicate the lexical verb with a -S inflection indicates real world now, and with a -D inflection indicates real world then, memory or imaginary world. And it's always affirmative, with a DO parameter, never BE or HAVE. No join row is needed to bind in the seam concept in sentences that consist just of subject-predicate word strings.

The other special case is when the subject concept is plural and world is real world, i.e., present tense. In this case the seam concept is found in -s inflection of the subject lexical noun and not on the lexical verb as in a predicate. Curiously, in English, this same -s inflection has been pressed into use to indicate plurality in nouns generally. When world is memory or imaginary and number is plural the -s inflection remains on the subject noun along with a -d inflection on the lexical verb of the predicate.

The appropriate join rows to make these observation concepts are:

Subject~verb-s=observation12 (singular-real world)
Subject~verb-d=observation31 (singular-memory world)
Subject-s~verb=observation44 (plural-real world)
Subject-s~verb-d=observation53 (plural-memory world)

Most finite sentences end here. However, some go in to add "a" after comma time, place, reason, or manner post-modifier phrase, step 522. These are very similar to the pre-modifier concepts. Again they should be pre-built, step 520, and have a concept ID# so they can be joined on to the observation with a single Type 3 join row.

All of the observation component concepts are encoded in the finite sentence by various natural language techniques. It is second nature for a literate second person to pick them off the text, to decode them. It is automatic. Our M5 composer must detect them and and make sure they are added on to the observation correctly.

Translating a finite sentence, "At a most basic level, Richard Price's new book is a police procedural," into an observation concept.

First, observation concept ID#Observation32 is assigned to the observation, e.g., as this observation is being sourced from the second sentence of the third paragraph of the article. Observation32 is now the concept ID# of the whole sentence in this example.

An installer program can be configured to install the vocabulary rows into the database automatically.

Now, to prebuild the preceder concept (step 504) and the three core concepts of this observation (step 506-514): the installer constructs the preceder concept: "At a most basic level," e.g., producing concept ID#AAMBL. Next the subject phrase, "Richard Price's new book," becomes, e.g., subject concept RPNB. The seam concept is is. Then, relative concept, e.g., APP is translated from the apposition phrase "a police procedural."

Now it takes just three more join rows to build the observation concept itself.

AAMBL~Observation32=Observation32

Which joins pre-modifier AAMBL to the observation concept with the type 3 join row.

RPNB~is=RPNBis

Which joins subject concept RPNB to the observer-assessment concept is with the Type 1 join row RPNBis~APP=Observation32

Which joins concept RPNBis to the relative concept APP with a Type 1 join row to make the observation concept Observation32.

FIG. 7 illustrates the M5 database created:

Now this set of vocabulary and join rows are sufficient to enable a parser to parse the complete sentence, "At a most basic level, Richard Price's new book is a police procedural," when it is, e.g., typed into the parser program.

vii. Question Concepts

A finite question is very similar to a finite sentence; it describes a question concept with a unique concept ID# just like a sentence describes an observation concept with a unique concept ID#. The method of a question is to ask whether a particular concept is there in the knowledge store or whether a particular relation is true.

The following are typical observation starters: "She did not . . . "—"The president of the United States did . . . "—"I May . . . ," etc. The corresponding question-starters are reversed; "Did she not . . . ?" "Did the president of the United States . . . ? "May I . . . ?," etc.

In constructing the core triad concept of an observation, the subject concept is joined to the seam concept first as explained above and recreated here:

subject~seam=subjectseam

And then join on the relative concept:

subjectseam~relative=observation in the corresponding question concept the order of subject and seam is reversed:

seam~subject=seamsubject

And then join on the relative concept:

seamsubject~relative=question

Lets say "Hannah is going to the movies" is sentence82 in a knowledge domain. The corresponding question "is Hannah going to the movies?" is built as follows:

is~Hannah=isHannah isHannah~going to the movies=question82

The power of the response field becomes more evident when looking at questions. For example, when the database is used in conjunction with a user interface, e.g., as part of a website, CRM system, FAQ system, etc., the response field can include a pointer to a resource row that directs the system to respond, e.g., with any consumer. One can then see that highly interactive CRM or FAQ systems can be built around the database described herein.

f. The Structure of a Knowledge Domain i. Paragraph Concepts

A paragraph is composed of several finite sentences. Paragraph concepts are complex unitary mental concepts composed of several observation concepts joined to form a unit concept with its own unique concept ID#. One has to think of a paragraph concept as a "paragraph-long' thought. One cannot hold an entire paragraph thought in consciousness at one time, yet there is a mental facility for unconsciously weighing the integrity and coherence of such grander-than-observation concepts and appreciating their complete meaning.

The paragraph concept is illustrative of the general principle that underlies M5: when two or more concepts are brought into relation they change, they adapt, to fit with each other. So as soon as the second sentence of a paragraph is added to the first, the first changes its meaning subtly and the meaning the paragraph concept develops. Then the change in the first reflects back to second. And when the third is added it affects the first two. And of course the meaning of the whole paragraph concept is changing and reflecting meaning back into each component concept.

The paragraph as a whole has a meaning; it paints a picture, outlines a logical argument, discloses the steps of process, tells a story, etc. Lets say one of the component observation concepts of a particular paragraph does not fit in with the whole paragraph concept. It could not be a component; "it strikes a discordant note." It may be possible for the paragraph itself and all previous component observations to radically change meaning so that now they all fit together perfectly. Such radical, "game changing," transformations are the task of the punch line, the last observation of a joke or story. For example:

"At last, after much effort, an English lady found a psychic who conducted a séance where she able to make contact with her late husband. Asked what it was like he replied. "We take it easy mostly, we sit around, then we have something to eat, take a nap, have some sex, have something to eat, have more sex, go inside and get a good night's sleep. Most days are like this". "I didn't realize Heaven was like that" she said. 'Heaven, no, I'm a rabbit in Arizona'."

Here the last sentence changes everything; however, sometimes the meaning of a highly nuanced paragraph concept can change, a movement in semantic n-space reflected in M5 by slightly adjusting its concept ID#.

It is reasonable to ask whether each of the component observations fits and that the ensemble makes an integrated whole. Achieving this is the essence of good writing. Discordant component observations are often admissible if tagged as a but or yet modifier concept.

Let's say that a paragraph composed of four sentences describes a paragraph concept composed of four observations. The way this complex paragraph concept can be modeled in M5 is to have the period at the end of each sentence to stand for a concept-ellipsis that is the whole paragraph. So there are four Type 3 join rows created: the first observation concept ID# joins with the paragraph concept ID# to produce the paragraph concept ID#, the second observation concept ID# joins with the paragraph concept ID# to produce the paragraph concept ID#, and so on for the other two observations. These four join rows in the database will allow a parser program to parse the text of the entire paragraph to obtain the unique concept ID# of the paragraph concept.

The wonderful power of the human mind to manage this adaptation of concepts to each other, which comes from our ability to think in pictures, is well beyond the powers of any present computer program; however we can record the process faithfully by consistently changing concept ID#s to reflect meaning changes when concepts become related.

Thus, after each sentence the parser will encounter a period. The period stands in for the paragraph complex concept that observation1 concept has to take its place in. So the parser looks for and finds a legal Type 3 join row fix.

Here are the join rows of a paragraph concept. This join row once and for all puts Observation1 into its final place in Paragraph1.

Observation1~.=Paragraph1

It has the same meaning as:

Observation1~Paragraph1=Paragraph1

But this latter join row is redundant and may be omitted because Paragraph1 is unique in this knowledge domain. Observation1 is in paragraph1 so the comma must mean paragraph1.

The observations of a paragraph are joined in with Type 3 join rows like:

Observation1~.=Paragraph1
Observation2~.=Paragraph2
Observation3~.=Paragraph3
Observation4~.=Paragraph4

A paragraph concept is one kind of group concept. And the above set of rows also illustrates the idea of a template concept; if actual concept ID#s were edited over these generic ID#s it would instantly create a working paragraph concept.

ii. Domain and Heading Concepts

There is no upper limit on the size of a complex concept. The knowledge domain concept falls towards the upper limit of concept complexity. It is a single concept just like noun phrase, verb phrase, seam, modifier, observation, paragraph, header, or chapter concepts. A knowledge domain itself has a grand tree structure. And no matter how many subconcepts it is composed of it can still be represented by a single unit concept ID# just like the other concepts already discussed. That concept ID number represents its meaning.

Articles are organized under headings, paragraphs, sentences, and words forming a tree structure. A sentence is just one sampling. The sentences of a paragraph fit together painting a small picture of some aspect of the domain. The article as a whole has a structure since the sentences are arranged in order under headings, which also have an order in paragraphs that have an order too. Language documents are often represented as an outline in word processors or captured numerically in chapter and verse as in the bible.

The systems and methods described herein follow this same design organizing a knowledge domain on a tree structure. Finite Sentences translate to observation concepts, paragraphs to paragraph concepts, headings to heading concepts and the entire article to a domain concept. Each observation is both identified and located by its ID#. Domain location concept ID#s can be used interchangeably in the join rows with the concept ID#s derived from other concept ID# schemata.

A typical domain of knowledge would be an essay on the Olympic Games by Barry Newman in the Wall Street Journal on Apr. 12, 2008 titled "The Show Will Go On" and subtitled with the apposition "The pomp of the Olympics has long been a favorite of authoritarian governments. This year will be no exception".

This domain's concept ID# could be obtained from its title; TSWGO or it could be assigned on the domain address schema: Domain67

This essay has four headings whose concept ID# could be obtained from their text or assigned address based concept ID#s:

| Fanfare and Face | FAF | 10 paragraphs |
| The Grand German Plan | TGGP | 9 paragraphs |
| Generational Ties | GP | 7 paragraphs |
| An Inglorious Past | TIP | 6 paragraphs |

Headings are usually consist of a few words that parse to a unique concept ID#.

Examples of heading concepts might occur in a 2000 word review in a scientific journal on, say, the el Nino current in the Pacific Ocean, or a chapter of a textbook. This typically might have no headings and might consist of a dozen paragraphs each with an average of four finite sentences, 40 to 50 sentences in all.

Figure 8:
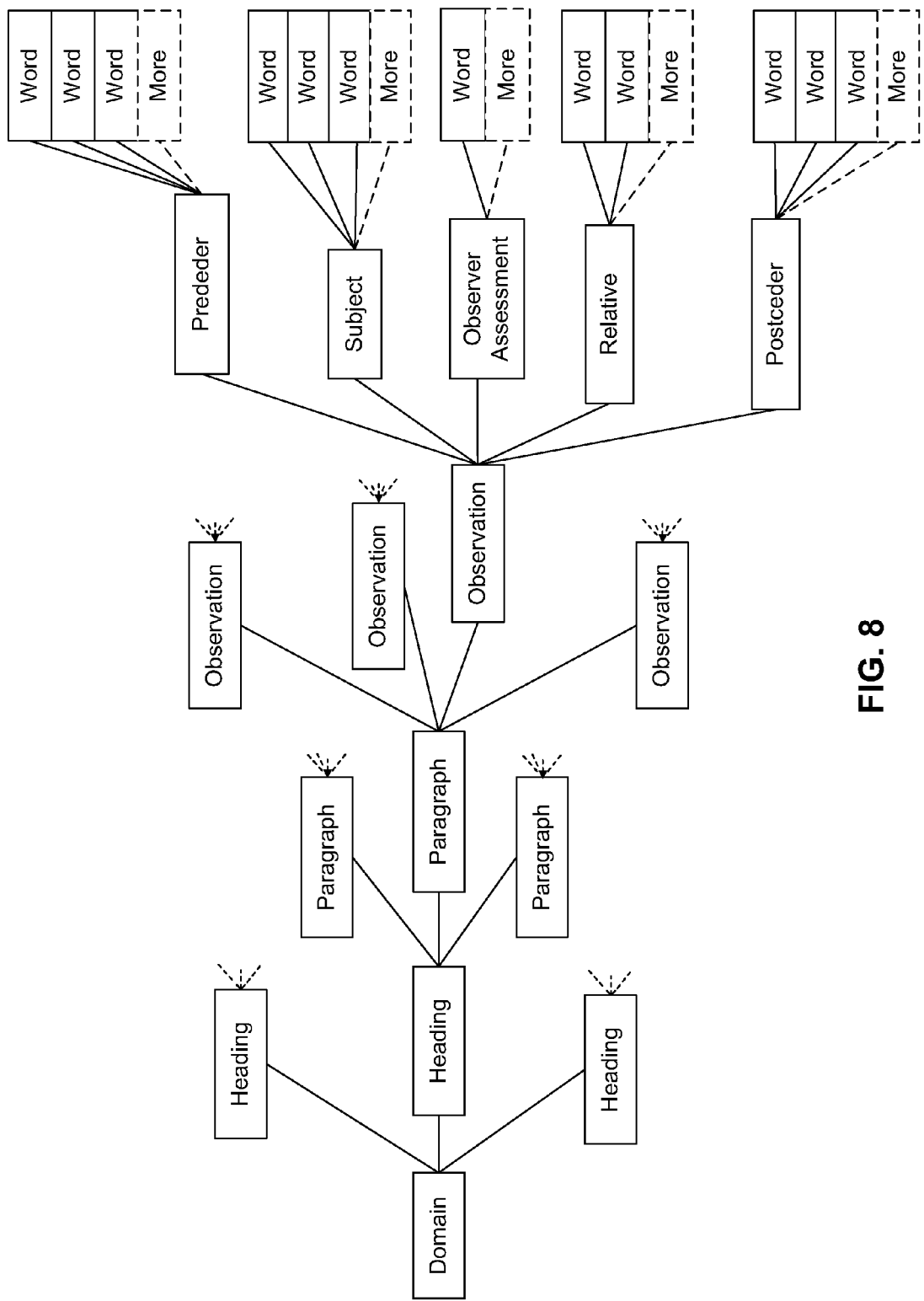
FIG. 8 is a tree diagram illustrating the structure of a domain concept that can be modeled using the tables of FIGS. 3 and 6.

The tree structure described above and illustrated in FIG. 8, can be the basis of one method for generating concept ID#s. It's a formal structure for holding the content but also a perfectly good schema for numbering the concepts of a particular knowledge domain by their position and independent of their meaning. Any set of concepts can be loaded into the tree structure and be ordered. Such concept ID#s have no mnemonic value with regard to meaning but do indicate exactly where the concept is in the knowledge domain, i.e., paragraph, story, article, etc.

A domain template is an example of the use of template sets of join rows using generic concept ID#s, where all the necessary join rows have been pre-assembled. When these position concept ID#s are replaced with explicit concept ID#s, it becomes an instant working database managing explicit new knowledge.

A knowledge domain can then be represented using the special order field/column of the M5 database. Every join row is tagged in this column by values in the order field of the concept record as to which observation and paragraph concept that idea is party to. Such a column structure can be very useful for keeping concepts in an organized structure. And for sorting of the database table back into order or into some useful new order. The purpose of the domain-header-paragraph-sentence-line order column is to impose a tree structure on the whole M5 knowledge domain, allowing concepts to take their place in the domain in a logical and convenient manner. Like a language text a domain of knowledge in M5 can be divided into numbered observation, paragraph, header, and domain concepts.

This tree structure can be specified in a formal table of join rows—holding the content but independent of the content. And it can be the basis for a useful schema for ID numbering the concepts in a particular knowledge domain. They lack mnemonic value for the meaning of the concepts but they do indicate exactly where in the knowledge domain the concept is located.

It also provides a place for insertion of new concepts into the exact observation concepts and context where they fit. This order column can also be very important for ancillary software programs, described below, to be aware of context, by enabling local search of the database for concepts when disambiguating which concept, say, a personal pronoun is referring to. This is a very powerful function for resolving ambiguity, allowing ancillary programs to operate at a truly human level in understanding text inputs.

g. Other Types of Concept
  i. Group Concept

One type of group concept is the And-Or group concept. The "and" group concept is an important and very common concept, described by a text string of the form "A and B," "A, B, and C," "A, B, C, and D," etc., where A, B, C, and D are individual concepts, always of the same type, e.g., "Tom, Dick and Harry." But, the member concepts of the group can be any kind of concept including quite complex concepts such as concepts described by noun phrases, verb phrases predicates, or full finite sentences.

The "or" group concept is very similar and is described by a text string of the form "A or B," "A, B, or C," "A, B, C, or D," etc. Again A, B, C, and D are individual concepts, always of the same type, e.g., "Tom, Dick and Harry." And again, the member concepts of the group can be any kind of concept including quite complex concepts such as concepts described by noun phrases, verb phrases predicates, or full finite sentences.

Such a group concept almost never appears on its own, except as a label for a graphic where it is put in relation with the graphic, but nearly always in relation with another neighbor concept. The two concepts then interact to change each other's meaning; its meaning adapts to the presence of this neighbor concept.

The simplest set of the pointer-associated rows required to construct a group concept are as follows:

|   | Vocab | Join | Concept ID# | Text |
|---|---|---|---|---|
| 1 | , |  | , | "," |
| 2 | and |  | and | "and" |
| 3 |  | A~, | and23 | "A, B and C" |
| 4 |  | and~C | AC | "and C" |
| 5 |  | B~AC | BAC | "B and C" |
| 6 |  | and23~BAC | and23 | "A, B and C" |

The first step is to assign a concept ID# to the group concept, in this case and 23. Rows 1 and 2 are vocabulary rows for concepts. In row 3, concept A is joined to concept "," to produce concept A,. In row 4 concept A, is joined to concept B to produce concept A,B. In row 5, concept "and" is joined to concept C to produce concept AC. In row 6 concept A,B is joined to concept AC to produce concept AC.

With these six rows in the table parser program will be able to parse text string "A, B, and C" to obtain group concept ID# A,BAC. Again the principle is that the M5 composer must keep the needs of the parser in mind by making sure there is at least one join row containing explicit ID#s that the parser can use to uniquely identify and23.

However this simple table of joins is not adequate to transfer commutativity, associativity, and distributivity of a relation between a neighbor concept and the group to each of the members. This requires a more subtle table of join rows as shown below.

For groups like this, concept strings separated by commas or ands, the relation of the neighbor concept to each member of the group must be the same, and the same as the relation of the neighbor concept to the group concept. Commutativity as used herein refers to the ability to change the order of joins of subcomponent concept ID#s without changing the meaning of the complex concept being composed. Associativity, refers to the ability to change the order of join operations of subcomponent concept ID#s without changing the meaning of the complex concept being composed. Distributivity refers to or obtains, when the join of a concept ID# to the concept ID# of an A ,B, and C group distributes over each individual concept.

The member concepts of a group are commutative, i.e., changing their order sequence does not change the meaning of the group concept. Commutativity can be realized by a special type of row where the concept ID# of the group is joined to a member to produce the group concept again. In this way a parser program will obtain the same correct concept # of the group concept no matter what order the members appear in the text.

The distributive function can be enabled in the join table by adding rows where the relation to each member is explicated in its own row and a computer program can encompass distributivity by creating such individual rows automatically.

This requirement rejects the validity of, for example, the concept brush being related to the group concept your teeth and hair because the relations of brush to teeth and brush to hair are quite different relations. "Brush your teeth and hair" is a zeugma. It is possible to build such a mentally spurious concept, mark it as such, and prevent the distributive function operating by forbidding the creation the individual relation rows.

To obtain Commutativity, Associativity, and Distributivity for all the members of a group concept 4 standard join rows for each member of the group can be used:
  member~,=group,
  and~member=group,
  member~group=group
  group~member=group With these join rows in place for each member, a group text like "Tom, Dick, and Harry," can be parsed with any one or more of the group member names, separated by commas or ands, in either direction, in any order to derive the concept ID# of the group, i.e., group.

And when a relation with a neighbor is applied to the whole group it is necessary to add join rows for each member like:
  relation~member=relationgroup.
  member~relation=grouprelation.

To apply this same relation to the individual members.

ii. Observer Concept

Another type of concept is the observer concept. All declarative knowledge is relative to an observer; the critically important relationship between the observer and his knowledge is fully captured in M5 even though individual sentences are not tagged with observer information, since we know who the observer is. Every sentence must have a writer or speaker that marks it as his or hers; every observation concept must have an observer concept component in M5. Observer concepts are joined to the observation concept by adding a Type 3 join row to the table. It is also possible to tag the join row in a metadata field with the observers concept ID#.

iii. Quotation Concept

Another type of concept is the quotation concept. In language most word strings mean the idea that they represent, but a text string enclosed in quotation marks a quote concept not a "meaning" concept. Both language and M5 need to distinguish word strings from the ideas they mean. Language does it by enclosing the word string within quotation marks. In M5 it is necessary to build a quotation concept in distinction to a meaning concept. M5 can do this by joining a first inverted commas concept, standing in for the quotation concept that is being constructed, to the concept ID# of the word string to get the quotation concept. Then this is joined using a Type 3 join row to the second inverted commas to get the quotation concept again.

For example, a piece of dialog in a novel might be "Daisy said, 'Let's go to Starbucks for coffee'". In dialogs the convention is for a "Daisy said" observer-identifying sentence to precede the quote, followed by a comma or colon, which stands in for the whole concept being built, which is a quotation concept.

To parse a quoted text string, which is done in M5 with a:
componentconcept~wholeconcept=wholeconcept, Type 3 join row, the method is as follows: Let the text string, "Let's go to Starbucks for coffee," parse to concept27. The join rows required to parse the same string with quotation marks, "Let's go to Starbucks for coffee," and end up with text concept quotation27 rather than a meaning concept concept27 are:

"~concept27=quotation27
quotation27~"=quotation27

With these rows in the M5 table being used the standard parser will successfully parse "Let's go to Starbucks for coffee" to produce quotation27, which is a quotation type concept.

Now to parse the whole sentence, "Daisy said, 'Let's go to Starbucks for coffee'", there is a need to encode who said it, i.e., link daisysaid to the quote as an attribute of quotation27.

If there is only one instance of Daisysaid in the knowledge domain, the single join row can be used:

Daisysaid~,=quotation27

This join row is a good example of a punctuation mark standing in for the complete higher order concept being constructed.

If there are multiple Daisysaids, then the method is first to make sure the comma can be parsed. Use the row:

Daisysaid~,=Daisysaid

Then create a separate Type 3 join row for each quotation concept in the text corpus:

Daisysaid~quotation27=quotation27
Daisysaid~quotation28=quotation28

Some writers will render the line as "Let's go to Starbucks for coffee", Daisy said. To parse this version, the table needs join rows:

quotation27~,=quotation27
quotation27~Daisysaid=quotation27 iv. Imperative or Command Concepts

The text strings that we interpret as orders are imperative mood verb phrases without a subject. The implied subject is the second person. Commands parse to single concept ID#s and can get a join row representation in the M5 table like any other text string. The M5 composer can be responsible for inserting appropriate response concept ID#(s) in the response field of this join row.

For example, "Please open essay.doc in Microsoft Word" can, e.g., parse to POEIMW. In the text field of row POEIMW can be a link to the file, which would then open.

v. Response Concepts

The response column of an M5 table is where the M5 composer puts the concept ID# of responses to questions or commands. If the text input parses to a particular question concept, the response field of that record would contain the concept ID# for the answer to that question. The program finds the row of that answer and outputs the text in the text field of that row. The text field may contain hyperlinks so that computer programs can be invoked, documents, displayed, or web pages opened on natural language commands.

The response field can contain several responses AND-ed. Alternatively; several possible responses may be OR-ed so that one, picked at random by a random number generator, can be executed.

vi. Action Concepts

Just as we have the power to turn thoughts into actions because a thought or intention in the mind closely corresponds to the action we take and to the word string that describes the action. An action row is a special type of row in the database with links or pointers to other rows that activate appropriate computer program or programs to perform the action. Action rows can be accessed and activated in the same way as other concept rows with input strings. The pointer tree structure allows for a series of actions to be performed in order by the computer.

vii. Concept Templates

The various types of complex concept described above have standard structures, which can be represented by standard sets of join-rows. Such standard sets of join rows are the concept templates. In templates the standard component concepts are given generic concept ID#s, which can be replaced by the actual concept ID#s of the subconcepts of the new complex concept to build that complex concept in M5.

Remember that concepts subject, verb, reason, etc., can be complex concepts sourced from word strings that parse to single concept ID#s.

FIG. 9 shows the join rows of a functioning database template for an observation concept. Notice that the subcomponents of the observation Ob11 have been pre-assigned concept ID#s that reflect their position in the knowledge domain, i.e., S11 to the subject concept, V11 to the verb concept, and Or11 to the observer reality assessment concept.

When translating a finite sentence into M5, it is necessary first to develop each parapoint word string as a concept with its own concept ID# by creating the necessary join rows in an M5 table. Then to edit that concept ID# to the concept number pre-assigned for that particular parapoint in its template join row. Then to add this set to the template set.

The resulting sum set of join rows models the observation sourced from the finite sentence and allows that finite sentence to be parsed completely and also to parse when, where, how, and why questions associated with that finite sentence.

It is possible to construct a concept template for an entire domain concept. An M5 knowledge domain translated from a scientific paper or an article of 2000 words will consist of 20-30 observation concepts. A few more accrue from subordinate clauses, which also represent observation concepts, used in the construction of the formal concepts. Each observation concept template can be built with a set of 20-30 join rows, more if its concepts are complex. Certain other sets of join-rows can be added such as those that disambiguate deictics or define the niche concepts and response concepts that are used by a parser to interrogate the M5 domain with how and why questions; as explained below. When all of these rows are present and correct, one can interact with or interrogate the M5 table via the parser program at the same level that one can interact with or interrogate another person with the same knowledge.

Another type of concept for which it is useful to have a prebuilt concept template is the group concept. For example, to construct a group concept in M5 from the text "a king, a queen, and a beautiful princess." FIG. 10 is the M5 group concept template database that can be used. This group concept template is constructed from source text "A, B, and C".

A parser program parsing input text "A, B, and C" against this template database finds its concept ID# and13 and outputs text "A, B, and C"

Here is an actual run of an example parser program:
QUESTION
A, B or C
ANSWER
A, B or C FIG. 11 is the M5 group concept template database where concepts a king, a queen, and a beautiful princess have been constructed with appropriate join-rows to create concepts with ID#s AK, AQ and ABP.

Now, if we find and replace A with AK, B with AQ, and C with ABP we get a database with constructed concept of the text "a king, a queen, and a beautiful princess" and concatenate this database with the basic concept-building database above, we get a database which the parser can use to parse the text "a king, a queen, and a beautiful princess".

Some of these concept templates can be very elaborate and, for example may incorporate rows that manage when, how, where, and why questions about the concept. Editing standard templates can greatly sped up the construction of complex concepts.

4. Computer Programs of the Invention

Figure 12:
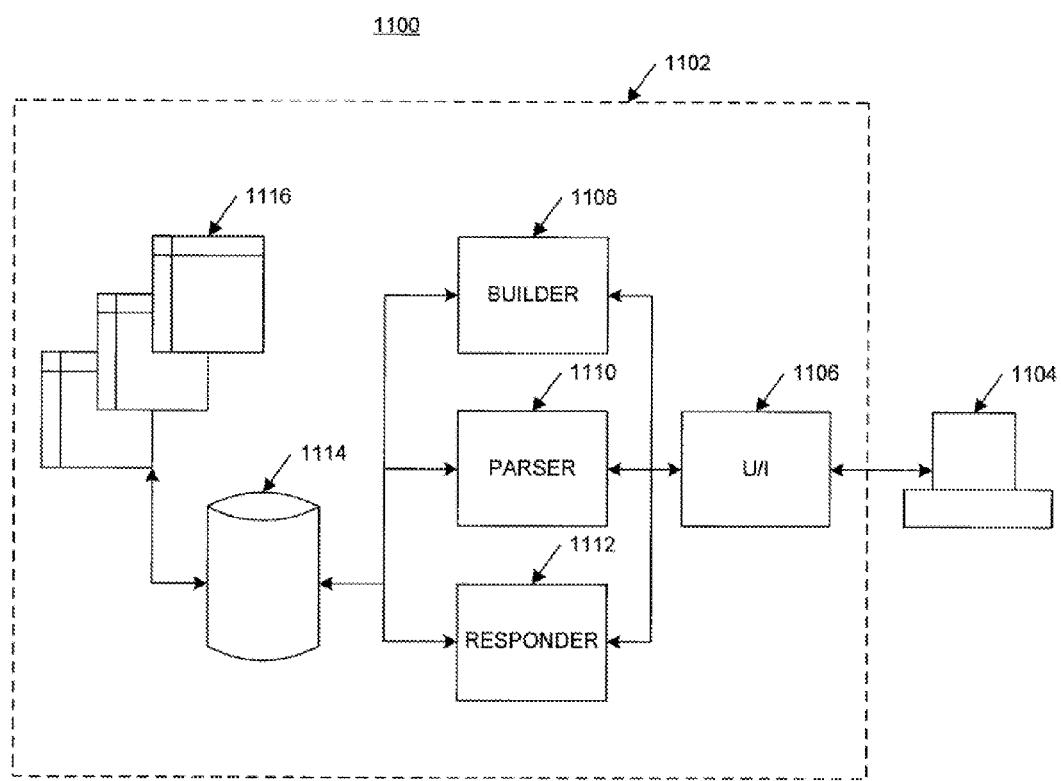
FIG. 12 is a diagram illustrating an example system configured to construct and store the tables of FIGS. 3, 7, 9, 10, and 11 and perform the parsing of FIGS. 1, 2, 6, and 13 in accordance with one embodiment.

FIG. 12 is a diagram illustrating an example system 1100 configured to carry out the processes described above. As can be seen, system 1100 includes the components of natural language processing system 1102 and a terminal 1104. Terminal 1104 can be used to interface with system 1102 and can for example be a laptop or desktop computer; a mobile computing device, such as a smartphone or palm computer; or any other type of computing device that can be configured to interface with system 1102.

System 1102 comprises a user interface 1106, which can be configured to interface system 1102 with terminal 1104; builder 1108; parser 1110; responder 1112; and storage 1114, which can be configured to store one or more tables 1116. User interface can, in certain embodiments, comprise text-to-speech processing (not shown), speech-to-text processing, or both.

Tables 1116 can comprise the data of various M5 databases formatted as described above. Builder 1108 can be configured to construct the tables in accordance with the rules and processes described herein. Once built, parser 1110 can be configured to parse text strings input through user interface 1106 using the tables in accordance with the rules and processes described herein, and responder 1112 can be configured to respond as instructed by responses stored in the tables.

It will be understood that system 1102 can be remote from terminal 1104 or can be included in terminal 1104. In general, system 1102 comprises the components, hardware and software, needed to implement the systems and methods described herein. The components comprising system 1102 can be co-located or distributed across multiple hardware platforms. For example, some or all of builder 1108, parser 1110, and responder 1112 can be implemented on one ore more servers or computers, which may also be configured to store tables 1116. In other embodiments, tables 116 can be stored remotely form the other components. Similarly, user interface 1106 can be co-located or remote from the other components.

Various components of system 1102 will now be described in detail. It will be understood that the components illustrated in FIG. 12 do not necessarily depict all of the necessary components, nor is the arrangement illustrated intended to convey the need for a particular infrastructure. Rather, the components and arrangement illustrated are by way of example only.

5. The Parser

Parser 1110 can be configured to parse an input string to find the join table row of the concept that it names by consulting the associated concept table 1116 for legal joins between concepts. For example, when a text string is input to system 1102, e.g., via interface 1106, parser 1110 can be configured to treat the text elements of the string as simple concept ID#s. Parser 1110 can be configured to then work along the string, consulting table 1116 to see if join between adjacent elements in the text string exists. Whenever one is found the two elements are replaced by the product concept ID# of their join found in table 1116. Then parser 1110 works along this product string consulting table 1116 in the same manner replacing any pairs found in the table to be joined with their product concept ID#. And so on until there is just one single concept ID#.

In certain embodiments, parser 1110 can make use of a two-dimensional array, which can comprise an x,y grid of cells. The words of the string of (n) words can be copied in ascending order into column 1 of the grid. Punctuation marks can be separated from words and treated like words because each punctuation mark can be considered a concept just like a word. The concept ID# for each word and punctuation mark can be obtained by lookup or algorithm, and posted to the adjacent cell in column 2 of the same row of the grid. Column 1 is now a list of words and punctuation marks; column 2 contains their concept ID#s in registration. This can be illustrated by the grid in FIG. 13.

Beginning at the top or bottom of column 2 (second from the right) the program now tests whether there is a join in the table for concept (n) and concept (n-1). If there is, the concept ID# of their combined concept product is posted to the next column, column 3, into a cell in the same row as the surviving concept of the join. If not concept numbers that do not join are posted to the cell in column 3 in the same row as before. This process is continued to the top or bottom of column 2. Now, all the legal joins have created product concept ID#s in column 3 and concept ID#s not yet involved in joins have been simply posted to column 3.

Starting over in column 3 the same process is repeated searching the table for a legal join between each concept ID# and the one directly adjacent, ignoring gaps, posting the results to column 4. This continues with the next column and the next until only one single concept ID# remains in the last column. As this process continues later columns contain successively fewer but more complex concepts. Finally there comes a column with only one concept. The text string has then been successfully parsed.

It will be decades before we will understand the brain's circuitry and software algorithms in enough detail to be able to compute mental operations. Although computers today cannot begin to perform the computations necessary to perform such operations of the mind, the systems and methods described herein demonstrate that a computer can readily record which mental operation it was, which operand concepts were involved, and identify the resulting concept returned. A benefit of the join table is that there is no longer a need to name the operators, know how they work, or actually perform mental operations in a computer. Rather, the operations can be treated like black box programs that are whatever they have to be to return the recorded result.

It will be seen that as parser 1110 runs, it avoids making joins across covert boundaries because such joins are absent from the join table. In this way the program is detecting covert boundaries in the text, which have been the nemesis of non-human parsers.

A parser 1110 that has the help of an M5 join table can perform with perfect accuracy, obtaining the precise meaning immediately. Previously, parsers without this help have had to consult elaborate sets of grammatical rules and vast databases of syntactically and semantically tagged words and phrases, only to develop several alternative parse structures. Then to judge which is the best one. This process has been fraught with error despite extraordinary efforts over many years, and remains so today.

i. Graceful Parse Failure

If parser 1110 cannot parse a particular string it may mean that the string is grammatically incorrect or nonsense. Or it may mean that the concept that the string means is not a registered concept in the associated table 1116 as yet. Or it may mean that the user has inputted a paraphrase or synonyms the legal joins of which have not been entered in table 1116. The table's administrator can be allowed to add these joins to the table if it seems appropriate so that particular legal string would parse correctly next time.

Sometimes, rarely, parser 1110 may make inappropriate joins because rows containing them exist by coincidence in another part of the database where they are legal. In certain embodiments, a backtracking program or routine can be implemented to see if parser 1110 can complete the parse if certain joins are nullified. Among other measures contemplated to defeat this problem is to restrict the join lookup domain to a smaller local region of the join database table, which makes finding an erratic join row less likely.

It should be noted that a successful parse of a text string requires obtaining a single concept ID# a root node for the whole tree. If no more joins can be found when the last column holds more than one concept ID# then parser 1110 has failed to parse the string. If the leaves of a substring all lead to one single root node the substring "makes sense" and will be understood to mean a recognizable mental concept. If not, the substring is "nonsense", is "meaningless, is "pointless", etc.

In certain embodiments, parser 1110 can be configured to finish building one subconcept before looking for joins to build the next concept along a column. This can be useful for preventing premature joins.

When parser 1110 fails to parse input text it indicates that it could not understand the text inputted. The invention includes diagnostic programs that display just which joins were detected during a parse operation. So if a parse fails it will be clear whether this occurred because the input text is ungrammatical or nonsense or whether there is a correctible deficiency or error in the M5 join table. Programmers versed in the art will be able to author monitoring programs that create very informative and intuitive graphic displays demonstrating parser performance.

b. The Builder

Builder 1108 can be used to construct tables 1116, i.e., to build an M5 database. In this case, an input text string is used to drive the construction of a database table able to model each concept structure that each text string names. For example, using the same x,y grid, words and punctuation marks of the input text string can be copied ascending into the cells of column 1 as before. Now, instead of searching the table for joins of concept numbers the joins constructed using builder 1108. In other words, builder 1108 can be used to indicate which particular adjacent concepts make a legal join.

In certain embodiments, a mouse-drag one can be used to drag a concept up or down the column and to drop it onto another. A unique product concept ID# of the join is generated and posted to a cell in the next column in the same row as the "surviving concept". A corresponding new join row defining the two component concepts and the product concept and documenting this join is added to the table. Concepts not involved on joins are posted as is to the next column. In this manner, the content of the grid filled out by actions of the composer using builder 1108 is identical to the content of the grid filled out by the parser program.

In type 1 joins one concept is being enriched by the other and becomes the surviving concept. For example, indefinite article determiners, a and the -s plural inflexion of nouns, and definite article determiner the are conceptually enriched by the descriptive content dragged on to them. And they are the surviving concept just as a noun concept being enriched by an adjective concept or a prepositional phrase concept is the surviving concept; just as a verb concept being enriched by an adverb or by its syntactical object concept is the surviving concept; and just as a preposition concept being enriched by its object concept is the surviving concept. The human installer indicates which is the surviving concept by dragging, the enriching concept onto it.

As before, next columns are processed until the last column holds only one concept ID#. This is the concept number of the entire string that was originally input. By this time, if there are (n) elements in the input string, approximately (2n) new join rows will have been added to the database join table. As it is common practice to construct a complex concept by assembling concepts into different subassemblies before final assembly—different text strings often instruct the building of the same complex concept in different ways—or in different order, some alternate joins are often specified in the table to allow for parsing paraphrases successfully.

In this venue, a permanent vocabulary and a permanent taxonomy of concepts can be built. This is the equivalent of a computer learning the functions of a relatively small number of punctuation marks, several hundred grammatical particles, prefixes, suffixes and inflections and perhaps 50,000 lexical words, and some hundreds of thousands of standard phrase concepts, that a person learns in a lifetime. With such a concept taxonomy available, the table building from an input string an be automatic since the vocabulary and many concept rows will have been installed before. Human supervision will be necessary only for novel words and novel concepts, of which, of course, there will still be many.

c. Algorithm for Generating Initialism Concept Codes; Automatic Generation of Concept ID#s Every concept can be assigned a unique concept ID that ideally needs to be generated automatically by builder 1108, though they can also be created and installed and edited manually in the table. Ideas need only be given unique numbers. The systems and methods described herein will work if these unique ID numbers are generated of example by a random number generating program or using a next accession #; however, it can be preferable to employ a methodology where the numbers generated have some meaning accessible to the administrator or user.

Thus, in certain embodiments, nearly all words, punctuation marks, prefixes, suffixes, and inflections are their own concept numbers. This can be done programmatically or by lookup table. There are occasions when it is useful to assign the same concept ID# to two different words if they are perfect synonyms in a particular context. For example it has been found useful to give both words "an" and "a" concept ID# a.

One method of generating unique concept ID#s from strings of words and punctuation marks is to concatenate upper case initials and punctuation marks of the preferred language phrase that describes the concept. For example, builder 1108 can be configured to generate the product concept number of a join of two words by concatenating upper case initials of the two words to form an acronym, initialism or alphabetism, that becomes the concept ID# of the word string. For example the product concept obtained by joining concept green to concept tree would be concept GT. Since GT is still tree enriched by green it is the surviving concept, GT is posted to the row of tree not of green in the concept building grid. When two upper case initialisms are joined, they can simply be concatenated. When a word concept is joined to an initialism, the initial of the word can be concatenated with the initialism.

Under this system of concept ID# generation, the concept ID# of any string will in most cases be the initialism made up of upper case initials of the entire string in same order. This is the basis of a very simple algorithm to generate the concept ID# of a string; however, this simple, quick methodology is not generally useful because the information as to where the joins occurred is lost, and the table of joins essential for parsing an unknown string will not be built. A simple, quick methodology for dealing with this issue will be described below.

Another important method of generating concept ID#s is to use locations in the domain as concept ID#s; however, any schema that generates unique concept ID#s will work with parser 1110.

d. The Intersection Method of Parsing

An alternative method of parsing a language text is the intersection method. The same database table 1116 issued as before, but with records that now have an extra field containing the concept ID#s of all concepts that the concept represented by that row is a subconcept of.

Using an x,y grid as before, start by copying ascending the words and punctuation marks of the text to be parsed into column 1. Parsing the string in column 1 backwards (or forwards), look up the set of concepts of which each concept is a subconcept. For each row post these sets of concept ID#s into column 2 into the adjacent field on the same row. Now starting in column 2 at row (n), intersect the set of concept ID#s in column2, row (n) with the set of concepts in column 2, row (n-1). If the intersection is not a null set, then the intersection contains just the concept ID# of concepts of which both (n) and (n-1) concepts are subconcepts. Now intersect this intersection with the concept ID# set in (n-2) row. Continue along the column as long as the intersection is not a null set; however, once the intersection becomes a null set a boundary has been detected. Post the surviving intersection to column 3 in the same row. Now, continue along to the end of column 2 starting with the new set that did not intersect and carry it along the column in the same fashion posting the surviving set to the next column when there is a null intersection. Continue this process until there is only one concept ID# in one cell of the last column. This is the concept ID# of the original string being parsed.

e. The Responder

Once the program deduces the precise meaning of the text string that has been input it is possible to associate a response with the string in the M5 database, or table 1116. For example, the response can be a response to a question posed, e.g., either in textual or audio output format. The response can also be to automatically bring up a web page that deals with the question, open a computer application like Word on particular document named in the instruction, or respond in myriad other ways.

f. An Alternative Method: Constructing Concepts Using Software Objects

1. Builder

It is also possible to model each clear idea or concept as a software object, employing object oriented programming, as an alternative to representing one as a database record. One can capture the properties of the concept, its relationships and make use of inheritance to enrich concepts.

Such an implementation, new information can be added in the form of a website, able to serve the application to as many people at the same time as the hardware can manage. For example, built on entirely free and open source software, a Linux server, using a Java application server Tomcat, and a MySQL database, such an embodiment can allow multiple people to work on the same "knowledge domain" or different people to work on different knowledge domains, or two or more people to work together on one knowledge domain. You can create an empty knowledge domain, and add users or edit a user's profile and add knowledge domains that they are allowed to read or read and modify.

In such implementations, database 1116 can be constructed of 3 main tables, each of them dealing with concepts and the interrelations between concepts. In this version, each concept can be instantiated, e.g., as a java.lang.Object, the class from which it descends. In a single inheritance class hierarchy (called glace.*), there are 9 different classes of Concept, each of them deriving originally from glace.Concept.

The concept types can be: Unknown, SimpleLexical, Motor, CompoundLexical, Complex, SeamMember, Seam, Look, See, Observation, and Schema. And each of them can be constructed from a main concept table, with many associate tables joined in. These 9 types of concept increase in complexity, and share common "components" of which there are quite a number. The specifics of these components make up the properties of the concept, and determine their complexity.

The collection of objects, stored in the database, can be located anywhere on the Internet, and queried by any parser 1110 allowed to access it. Web services can be configured to receive either inputs or outputs between ks, and XML documents describing Concepts and groups of Concepts can be passed between knowledge domains, for adding, modifying, enriching, or querying concepts. In this way, 2 or more independent knowledge domains can be combined to cover a domain of knowledge deeper than any single knowledge domain can.

ii. Parser

In such an embodiment, an utterance, e.g., a question, a phrase, a group of words, even single word, can be parsed in a specific way in order to retrieve the concepts it relates to and elicits.

The first stage is to carefully space out the utterance into words separated by single spaces, and place them into a 3 dimensional ConceptMatrix. The words themselves start at the top of each ConceptColumn, in row0. As parser 1110 moves from the left hand (column (0)) to the right hand column (column (n)) and then back again from column (n) to column (0), the preparation and "filling out" of the ConceptMatrix occurs. This happens in a number of stages. First, each word can be looked up in a special dictionary to determine whether it recognized, and classified as the potential parts of speech it might be. Many words have multiple types of usage—such as the word SET. It can be a verb, a noun, an adjective etc. Each of the types can then be tested sequentially, starting with the most likely. This an be determined both by the dictionary, and the context of the word within the utterance. These multiple dictionaryItems can be stored within the row1 cells of the ConceptMatrix.

The next stage of parsing decontracts some of the words that need to be expanded into 2 columns. An example of this is the verb in the sentence. A verb such as "swam" will initially get a single column, but once identified as a potential verb (past tense of the verb "to swim") a decontraction will occur. That is, one of the ConceptMatrix variations to be parsed, and there my be many for the parsing of a single utterance, is to treat "swam" as a verb and convert the ConceptColumn into 2 ConceptColumns, the first being a Motor concept called "-d" or a past-tense encasement, the second being the word "swim". There can be a third column pulled out of this "decontraction" method, and that would be in the case when a Seam ConceptColumn was not detected. Usually, in many observations, a Seam concept is present but not explicit and contained in the verb of the observation. It can be "decontracted" from the past-tense verb, and placed as a ConceptColumn before the raw verb, in this case swim, unless an adverb was detected, in which it is placed before the adverb.

The next stage of parsing goes through to omit columns from the ConceptMatrix, setting flags of detection to acknowledge the original phrasing, but eliminating the words from the parse. These words would be idioms, modifiers and "filler" words, which do have a role in describing what the user is conveying, but offer too many permuations and combinations without any benefit. For this reason, they are removed from the ConceptMatrix, but noted as a group of flags on the column and the conceptMatrix itself.

The next stage goes from Right to Left filling in each of the row2 cells with the lookup values (if there are any) of the row0 values, and placing any "Atomic" concepts into row2. In this way, the word "the" yields a Motor concept THE, the word "swim" yields the SimpleLexical "SWIM," and the word "be" yields the SeamMember "BE" in row2. Again, because there may be multiple different classes of atomic Concepts in row2 for each of the row0 items, and many versions of the ConceptMatrix may need to be run.

The next stage of the parser goes from right to left columns, slowly accumulating surviving concepts in a group of 3 "caches" based on a few input criteria. These caches are called "LexicalYield, and ConceptYield.

One criteria can be the Concept Type, of the 10 possible, a particular column contains. Usually the column will only have an "atomic" class—namely SimpleLexical, a Motor, or A SeamMember. With each "move" of the parser, a new row is created. If the parser is sitting on SimpleLexical column, and a Motor column is the one next left, the parser will prepare for an "encasement" method. This means that what is currently in the Concept, usually a set of Concepts, can be "encased" by the Motor concept coming up. If on the other hand, a SimpleLexical is coming up, then the operation can be to "intersect" the results of that word with the current set of concepts that the parsing has so far yielded. In a discrete number of permutations, a set of appropriate operations can be found for each case. The result is a group of concepts that do not necessarily combine with eachother in the ConceptYield cache. These Concepts are the potential answer to the question sought after, or the referrant of the phrasing used by the user.

The input tools or building application of these "knowledge domains" is also web based, and conversely, on the parser as a component of its own functionality. The reason for this is that when a user wants to input new information, it helps mostly if they use existing concepts to do so. To build many "parallel" but unconnected structures does not expand the geometric utility of the knowledge domain, and should be avoided. The only way to avoid this trap is to parse each of the input strings before building the new observation or Concept, so as to make sure it connects to the right concepts. There is no way for the user to be conscious of exactly what is in the knowledge domain, and using the parser as a component of the builder tools help achieve this. Multiple users can build at the same time, each taking advantage automatically in real-time, of the enrichments installed by the other users. While duplication of effort may begin to occur by accident, the concepts are quickly "de-duped" by the parser, which will discover multiple copies of the same connection.

One of the most exciting features of the Object based web-based system is the ability to link Concepts that exist in multiple knowledge domains. Because it is all online, and any parser can query and potentially add to and modify any knowledge domain, concepts created independently by different authors can be linked together. This means that a concept in a different knowledge domain—one that is quite enriched and deeply linked itself—can be the result of a query within a very shallow knowledge domain. But none of the work needed to create that enriched concept has to be duplicated—it can all be reused. In this way, teams of disperse individuals and organizations can create knowledge "constellations" by linking the star concepts in each of the knowledge domains they have access to modify. This way, much like the hyperlinking allowed on the internet, you can use the autonomy and distributed nature of the internet and the knowledge of it's users to create extremely valuable intellectual constructs for the advancement of knowledge and learning.

6. The Art of M5 Composition a. Introduction

Translating language into an M5 database format is akin to a writer writing well. The goal is to make the meaning clear and to make sure all of the concept ellipses of language are carefully restored. There are so many writing style help books and manuals on how to write well. Most publishers have strict style codes that authors must follow and editors enforce. A similar set of rules and standards will apply to the composer of M5.

A good M5 installer intuitively knows which type of join row to use and which ones will be required to encode knowledge and capture the nuances of meaning. It is an iterative process in which there is an element of trial and error. It is not possible to lay down an inclusive set of formal rules that will cover every situation encountered. An M5 composer versed in the art will find a way to compose the necessary set of join rows that will encode the complete knowledge and at the same time make sure that the parser program is fully accommodated. During the process he can test his composition with the parser, which can include a diagnostic window that displays which necessary joins it could not find, to see that the parser is accommodated.

It is the responsibility of the M5 composer to translate compressed language into uncompressed M5 database, to mentally perform the codec decompression that the mind normally does for its own purposes but to explicitly record the uncompressed product into M5. The degree of granularity varies with the need and the art is "not to put too fine a point on it." In any case M5 provides a format capable of holding all the detailed data.

Let's look at some examples that illustrate the kind of knowledge implied by plain text but not explicit in it that the M5 composer may judge is necessary to be added back.

When a plain text finite sentence is uttered in active voice, e.g., "the shortstop threw to first base" the second person knows that it is a baseball that was thrown and that it was thrown to the first baseman not to the base. Also an observation structured in the active voice implies the truth of another observation structured in the passive voice. The passive voice description of his action. "the baseball was thrown to the first baseman" becomes true. Also that the first baseman most probably caught the ball. Also that probably a runner was running to first base and may or may not have been "thrown out at first". The computer cannot know any of this. However, there is plenty of room in the M5 table for the composer to install all of these implied observation concepts; it is the art of M5 composition for an M5 composer to know how many to include in this knowledge domain instance without putting too fine a point on it.

Such implied concepts in each specific instance we added to the M5 database rather than establishing elaborate databases of "common sense" rules and elaborate programs that enable the comparer to figure out which applies in a particular instance, and the standard approach NLP workers have tried to employ in recent years, with very mixed results. Using such n approach makes a practical working system possible now, not many years hence.

In other examples: the single words "too" and "also" in a finite sentence imply that there was a previous instance of this same observation concept, which the M5 composer may need to install if questions about that previous observation are anticipated.

Finite sentences are often shortened to infinitive and gerund phrases in plain text. For example, in the verb phrase "featured many young American men sitting at tables with manuscripts while affecting the leonine look of Hemingway," the gerunds are shortened forms of the full finite sentences "many young American men sat at tables" and "many young American men affected the leonine look of Hemingway." These sentences obtained their seam parameters from "featured." In the following finite sentence "Stalinists were using fronts to rationalize Stalin's alliance with Hitler," the infinitive "to rationalize Stalin's alliance with Hitler" is shorthand for full finite sentence "the fronts would rationalize Stalin's alliance with Hitler." The M5 composer might judge it necessary to install both these full observation concepts along with their question concept counterparts so the parser could field questions from the interlocutor like "Did many young American men affect the look of Hemingway?" and "Would the fronts rationalize Stalin's alliance with Hitler?"

As mentioned in the discussion of paragraph concept several observations can fit together into a unitary concept. and often even if only one observation is reported, the second person will realize that the whole paragraph set applies. These sets of observations may fall along several lines like the path or course of events, course of action, a journey, a story or narrative. An observation annotated to indicate which one it lies on is enough of the M5 composer to know all the other observations of the set situation. These linear arrays of observations can be thought of as "why" dimensions, which can be referred to by an infinitive, or a "how" dimensions, which can be referred to by a phrase like "by taking the bus" when the course has its own name. They are quick ways of mentioning the signature observation further ahead or behind, and disclosing all the intermediate steps. The M5 composer choose to install all the step observations to be able to field questions like "What's going on?"

The time and space, way and why dimensions that an observation is in are often of great interest and are asked for with when, where, how, and why questions about the observation Similarly, "The president of the United States, commander in chief, considering the important policy decisions in Iraq has to think of the consequences as well as the benefits" is shorthand for two observations: "The president of the United States, commander in chief, considering the important policy decisions in Iraq has to think of the consequences; the president of the United States, commander in chief, considering the important policy decisions in Iraq has to think of the benefits." Here, "as well as" is a stand in for the long string: "The president of the United States, commander in chief, considering the important policy decisions in Iraq has to think of."

There is a need for explicit distribution of a relationship with a group to each of the members of the group. For example consider the finite sentence "Hannah picked up cereal, milk, and bread at the store".

Concept cereal,milkandbread is an and type group concept, but the related concept pickedup has to be distributed individually to each member of the group, requiring installation of the three observation concepts:

Hannahpickedupcerealtthestore,
Hannahpickedupmilkatthestore
Hannahpickedupbreadatthestore b. Double Meaning and Humor:

It is not unusual for an input text to have a double meaning. This is the basis of humor. When an input text has double meaning it can be parsed to two different concept ID#s.

For example, consider the old chestnut of natural language researchers: "I saw the statue of liberty flying in from Boston." Making this text input parse to the intended meaning of concept ID# observaton64 would require the following join rows in the table:

saw~TSOL=STSOL
I~STSOL=observaton64
observaton64~flyinginfromBoston=observaton64

To parse to the "funny" meaning would require the following join rows in the table:

thestatueofliberty~flyinginfromBoston=TSOLFIFB
saw~TSOLFIFB=STSOLFIFB
I—STSOLFIFB=observaton64f It is the responsibility of the M5 composer to 'get it", to see the double meaning, and make the appropriate join rows to get to the correct intended meaning, and thus make the response appropriate. On the other hand the M5 composer, getting the joke, could recognize this and in the response output text like "Don't be silly, the Statue of Liberty can't fly."

c. A Method for Managing Allusions by Adding Appropriate Join Rows to the M5 Database and Linking Them to the Allusion:

It is possible to detect allusions and metaphors and make them accessible to simple computer programs interacting with M5.

Consider the text:

"Are the heroes of picaresque the blondes of literature? They certainly have more fun. They're never stuck at home on a Saturday night. They're never stuck at home, period. Dubious company becomes them. We count on them for brazen behavior, the more so as it's their job to expose the rotten planks of society, the underside of human nature. If they're not conning someone into whitewashing the fence, they can be found cozying up to the wrong woman. To their ranks, the two Toms, Sawyer and Jones, may welcome Johnny One-Eye, Jerome Charyn's newest brainchild."

Four allusions are packed into the first paragraph of Stacy Schiff's Review of *Johnny One-Eye:* Blondes have more fun to the Clairol jingle, stuck at home on a Saturday night to Marty, conning someone into whitewashing the fence to a famous episode in Mark Twain's *Tom Sawyer*, and the two Toms, Sawyer and Jones to the characters in Twain's novel *Tom Sawyer* and Fielding's *Tom Jones*. To incorporate allusion into M5, a set of join rows that represent the allusion can be added, making an allusion concept, and employ it as an apposition to the concept defined in the text making the allusion. Similarly, metaphors can be detected by the M5 composer and both meanings made available to M5's interlocutor.

M5 format is a powerful tool. Its ability to exploce a single complex concept ID# into a myriad of component concepts allows for a search method that searches within words. Templates enable methods for applying rules and logic to particular aspects of knowledge; methods for mechanistic testing of syllogisms, methods for applying logic to answering questions and for generating new concept simplied by the existence of current rows.

d. Synonyms and Paraphrases

Many different text strings can be used to state what is for all practical purposes the same idea, i.e., there are often many different ways refer to the same concept. This creates a serious combinatorial problem to be dealt with in natural language computing, particularly with longer strings. For example, a string of 20 words meaning a single precise idea can be phrased in more than trillion unique word strings, in the region of $2^{20}$ to $3^{20}$ allowing 2 or 3 alternative words at each position, without seriously changing the meaning. This renders a method that employs lookup of stored word strings impractical. Responses to standard greetings like "Hello," "Good morning," "How do you do," and "Fine," can easily be handled with stored strings, but that's about the limit.

In the systems and methods described herein, a complex concept can be broken up into its main component concepts thus reducing the number of positions that a variant can appear, say from 20 down to 4. Each of these requires just a few paraphrases to identify its concept ID#. Some paraphrases are more likely to be used than others and these are anticipated selectively. Then it is arranged that the complex concept can be identified by mentioning all of the components or just a sufficient subset so that it no longer matters how many of them appear in the text string. Next, by using type3 joins between the concept ID# of the whole concept and that of each of its components, it no longer matters in which order they appear in the text, which greatly increases the number of paraphrases that can be fielded.

All the likely paraphrases for each component concept can then be constructed. This will produce a different concept ID# initialism for each paraphrase. These concept ID#s are then edited in the database table to the same preferred concept ID# so that no matter which paraphrase is used the same concept ID# row will be found on parsing the string. If a user happens to employ a novel but valid paraphrase for a component concept, then this just has to be added, a matter of one or more vocabulary rows and perhaps one or two join rows.

The result is that the number of rows needed to field, say, all the valid 10 word strings that mean a particular concept, is not millions but rather the sum of the numbers of variants at many fewer positions.

Often, an expression is used to name a particular concept that contains a word for which several synonyms could be used. It may be necessary to replicate the row where the original word is being joined in with rows that employ synonyms instead. This will ensure the string parses to the same concept ID# no matter which synonym is used.

7. Data Compression by Ellipsis and Concept-Ellipsis a. Data Compression in Language In most verbal communication and for various reasons, a lot is left out of most utterances. For example, when a complex idea has been carefully explicated by a long string of words and has to be mentioned twice more in a sentence: Nothing causes impatience more than when a speaker repeats the same long string to refer to the same idea three times in the same sentence. Language has evolved very efficient methods of data compression; language has found ways to use symbols: lexical words, grammatical particles, or punctuation marks, to stand for that repeated idea. Non-explicated concepts can mostly be readily reinstated by the listener, or second person.

Skilled speakers leave out words that are unnecessary without loss of information, words that the second person can readily put back in. An ellipsis is the left out word or phrase necessary for a complete syntactical construction but not necessary for understanding that is left out of a text. In the systems and methods described herein, a concept-ellipsis is the missing concept not transmitted, the concept that the missing words meant.

Language can be viewed as just straightforward concept building instructions. Punctuation marks, grammatical particles and lexical words all indicate locations on the concept tree that indicate where a concept is to be joined in. In a sense they stand for or mean the missing but implicit concept. They indicate precisely where a subconcept named by an appropriate string can be legally joined in to continue the construction of a complex concept. Punctuation marks stand in for the higher order complex concept that the concept just parsed before the mark is to be inserted into. Grammaticals and lexicals stand in for a sub-component concept that is to be joined in to the higher order complex concept being constructed.

All the elements of language indicate an ellipsis; that there is something absent from the text, that a missing concept, often one represented by a long word string, should be put in the place of the deictic. One can think of punctuation marks, grammatical particles, and lexical words as marking a point where some string or ellipsis should be inserted, like adding a branch to a tree, and a concept in its own right that stands for the concept defined by a long string or ellipsis and which is to be joined to its neighbor concept.

The problem is to figure out just what that concept should be in different instances. Grammaticals are critically important because they enable shortening of utterances in the slow language communication channel. When one considers that these short words often have referents that take long strings to define, whole sentences and even paragraphs, the purpose of the grammaticals in language becomes immediately apparent. It is a natural form of data compression, which enables complex knowledge to be transmitted with many fewer words.

It is easily understood in the case of personal pronoun grammaticals, where "he" could easily stand in for "Fiorello La Guardia, the former mayor of New York"; not so easily understood that grammaticals like "that" and "such" can stand in for long strings. Grammatical "do" is exemplary:

"Do you, Harry, take Jane, to be your wife, to have and to hold, for better or for worse, for richer, for poorer, in sickness and in health, but not for lunch, to love and to cherish; from this day forward until death do you part?"

"I do"

"Put your left hand on the bible and raise your right hand. Repeat after me.' Do you swear to tell the truth the whole truth and nothing but the truth so help you god?'"

"I do"

In the first example, it is clear that word "I" stands for Harry, the bridegroom and "do" stands for the whole long verb phrase which depicts the quite complex concept: "do take Jane, to be my wife, to have and to hold, for better or for worse, for richer, for poorer, in sickness and in health, but not for lunch, to love and to cherish; from this day forward until death do you part." In the next example the meaning of "do" is swear to tell the truth the whole truth and nothing but the truth so help me god. But, the next time "do" is used it will mean something totally different.

b. Managing Punctuation Marks as Ellipsis Markers

It is easy to understand that personal pronouns like "it" can stand in for long word strings. But, punctuation marks can also be seen to function just like personal pronouns, standing in for complex concepts.

In the systems and methods described herein, language text is treated as instructions for constructing complex mental concepts. Thus, a punctuation mark indicates that a text string in complete and the corresponding concept ID# has been identified. Now that concept can be put permanently into its final place in the complex end concept being constructed. The punctuation mark does this by being a concept-ellipsis marker that stands for that whole end concept being constructed, one that may require a long text string to specify it. The insertion is done by adding a new join of the special Type 3 that joins that concept ID# of the text string to the concept ID# of the punctuation mark to give the concept ID# of the end concept: This row enables parser 1110 to manage the punctuation mark and pre-identify the end concept being built:

premodifier~,=wholeendconcept14

If join premodifier~, is unique in the table 1116, then this join row is the only one needed. Since the comma has exactly the same meaning as the whole end concept, its meaning is exactly the same as that of its more explicit version:

premodifier~wholeendconcept14=wholeendconcept14, which then is not needed.

The chief function of punctuation marks is to indicate where an ellipsis could be reinstated in a text and where a concept-ellipsis has to be reinstated in the concept tree. Punctuation marks stand in for higher order concepts and indicate that such a higher order concept is being constructed.

Since the idea that a punctuation mark can stand for a long text string, defining a higher-order concept is not intuitive, an example is provided here. Consider ditto marks as instructive in that how they function is already understood.

Ditto marks, consisting of two apostrophes ('') indicate that the item above is to be repeated. They obviously indicate an ellipsis.

The atomic weight of lead is 207.2

" " silicon is 22.1
" " copper is 62.55
" " iron is 55.85
" " gold is 195.7

It is easy to see how ditto marks indicate ellipses. It is a little more difficult to realize that all of the other punctuation marks, like a comma, also indicate ellipses.

The nature of language requires it to be a one-dimensional string of elements. Replacing the ditto marks in the above table with commas, it could be rendered as a one-dimensional text as "The atomic weight of lead is 207.2, silicon 22.1, copper 62.55, iron 55.85, gold 195.7"

which, put back into table form without changing the order of the elements, would look like this:

The atomic weight of lead is 207.2
' silicon 22.1
' copper 62.55
' iron 55.85
' gold 195.7

This shows commas functioning just like pairs of ditto marks and standing for "the atomic weight of."

In the simplest case of ellipsis the apostrophes of possessives indicate missing letters as in: John's coat=The coat John (ha)s—He's walking home=He (i)s walking home, etc.

In another example:

"In the interests of economy of words skilled speakers leave out words that are unnecessary without loss of information, words that the second person can readily put back in" would be rendered uncompressed as "In the interests of economy of words skilled speakers leave out words that are unnecessary without loss of information (In the interests of terseness skilled speakers leave out) words that the second person can readily put back in."

At the syntax level the comma stands for the whole long string: "In the interests of economy of words skilled speakers leave out." The role of the comma can thus be seen in a different light as an ellipse marker.

Thus, the comma stands for the senior or higher-order complex concept that is being constructed. Each member concept, subordinate concept, and component concept is joined in to it in turn.

In this next example "There was a king, a queen and a beautiful princess." The group concept named by text string "a king, a queen and a beautiful princess" can first be built and then "there was" can be related to it.

Group concept construction can be done in the following manner using builder 1103 as described above: first assign an arbitrary concept ID#, say and34, to the final higher-order group concept. Then mouse drag concept a beautiful princess back onto concept and to make concept and a beautiful princess. Concept building program 1103 creates and adds the following new join row to the database:

And~a beautiful princess=and34

Now drag concept a queen onto concept and34, i.e., concept a king, a queen and a beautiful princess, to get group concept and34 again. This addition can be done by creating a new join row in the database:

a queen~and34=and34

The final fully differentiated group concept and34 still needs concept a king to be joined to it to make final concept and34, i.e., a king, a queen and a beautiful princess. This addition is done by creating a new join row in the database a king~,=and34

In the first of these join rows concept the king is joined to the explicit final concept and34. In the second join row the king is joined to the comma, which stands in for the elided concept and34. The function of the second join row is to make sure parser 1110 can interpret the comma correctly in this context when it encounters it.

One more join row is required to make sure the parser can parse the text string "a king, a queen and a beautiful princess": and34~and34=and34

To add more member concepts to the group as in group of the type named by longer expressions like "A, B, C, and D" or "A, B, C, D, E, and F," each new group member concept is added by creating a join row that joins it to the final group concept ID#.

This is the method for constructing an "and" type group concept. An "or" type group concept is constructed in exactly the same manner by substituting concept "or" for concept "and" in the created join rows.

These procedures illustrate two important processes that can be implemented in the systems and methods described herein: 1. whenever a punctuation mark is joined to a concept, a second replicate join row can be created in which the actual concept ID# replaces the punctuation mark standing in for it; 2. whenever a complex concept with many parts is being built, an arbitrary final concept ID# can be assigned to it up front to which the parts can be joined.

Although punctuation marks indicate where a component concept should be inserted, i.e., to the punctuation mark, the string naming the concept to be joined in to the comma may not always be obvious. It is always the task of the second person is to figure out just which concept to reinstate, to decompress the input text string; however, computers are at present not good at it.

To deal with this deficiency, a human installer can indicate at concept construction time the precise meaning of the punctuation mark in each instance by supplying the actual concept ID# of the concept-ellipsis. The tight attachment of the punctuation mark to the previous phrase specifies a close join between that phrase's concept and the inserted concept. This relation can be modeled in M5 by a join row where the concept ID# of the first concept is joined to the punctuation mark concept to produce a complex concept. Then a duplicate row is created where punctuation mark is replaced by the explicit concept ID# of the concept that the punctuation mark means, to produce precisely the same complex concept. This allows parser 1110 to obtain the same correct concept ID# of the complex concept whether a punctuation mark or the full text defining the sub-concept is used by the first person. Using this method of explicit restoration of concepts elided in the text into the join table, it is possible to capture the exact full meaning of any text.

As explained below in the description of the paragraph concept, the period at the end of each sentence stands for ellipsis of the entire paragraph. In each row that models this situation observation concept ID# joins with the period concept ID# to produce the paragraph concept ID#, in the duplicate row the observation concept ID# joins with the paragraph concept ID# to produce the paragraph concept ID#.

The functions of punctuation marks are subtle and powerful. In any instance it may be possible to interpret any one in different ways. As explained below in the description of the observation concept.

With a comma, the higher order concept it stands in for retains its natural sense. Other punctuation marks do more; while they do mark the spot where a concept should be inserted they go further and put some special spin of their own on the sense of the higher order they represent. Different punctuation marks change the meaning of the string affecting the concept being inserted. For example, a colon types its insert as the same thing in other words, e.g., "he released the news with this result: the stock went down." Here the colon is indicating that the stock went down is a result. A join to a? concept makes a concept a question. A join to a! concept makes a concept an emphatic or loud concept.

c. Managing Grammaticals as Ellipsis Markers i. Introduction

Grammatical particles are the short words of language like "it" and "from," "as" and "that." There are a fixed set of several hundred of them in English as opposed to the list of hundreds of thousands of lexical words which a constantly being supplemented.

The current linguistics literature does not have a satisfactory unified theory of how grammaticals function.

The following examples show how a very short grammatical particle can mean a very complex concept and thus provide superb data compression for the slow language channel. For these reinsertions of concept ellipses at a marked point the question often becomes where the second person finds the string that defines which subconcept is being reinserted. Most often the string, if there is space in the text for it right there, is found immediately following the grammatical particle. In the above examples it was a string that appeared earlier in the same sentence and which was then repeated, or it was found right after the insertion point. Sometimes, the text to be inserted at the point of the punctuation mark or grammatical particle is found, as with the personal pronouns, in a separate sentence earlier in the text, anaphora or later in the text, cataphora, and sometimes it is not found at all in the text and must be made up from the second person's knowledge.

The problem for computers parsing text, and also for human readers, is that because many words like "do" have such complex and varied meaning, all the meaning must somehow be retrieved from somewhere and its contained concepts managed. This is probably the sticking point that has resulted in the 50 years of failure for researchers in the field of computer semantics and natural language processing. Virtually all projects in the field have tried to mimic the operations of the human mind, e.g., to think in pictures, and all have fallen far short. It will be 50-100 years before such emulation will be practical.

Grammatical particles work very similarly to punctuation marks, but all put their own spin on the concept, missing from the text but reinserted in M5. Grammatical particles are used instead of punctuation marks when the concept to be reinstated has to be special. Grammatical particles are used when there is spin to be applied to the concept reinserted. For example, in "Henry travels TO South Boston" TO is a marker concept that attaches closely to verb concept travels and enriches its meaning very like an adjective affects the meaning of a noun. But TO adds special destination meaning to its object concept South Boston. TO adds the idea of a South Boston destination to travels to give a special sense to travels. In "Henry travels FROM South Boston," FROM adds the idea of South Boston as a starting point to concept travels. Grammaticals like "as well as," "as to," etc., subtly change the meaning of the concept they stand for in their own idiosyncratic way. Grammaticals have very little meaning in their own right but their meaning is not zero in that they put a spin on the text string ellipsis that they replace.

ii. Doublet Grammaticals

Special cases of grammaticals are the doublet grammaticals such as "if . . . then . . . ," "so . . . that . . . ," "less . . . than . . . ," "more . . . than . . . ," which may be separated in the text by modifiers. These allow the insertion of two concepts that have a certain defined relationship to each other at a definite point in the growing complex concept being defined by the language text.

iii. Conjunctions

When two observation concepts are in relation they adapt to fit with each other. Conjunctions are the grammaticals that pick up the conceptual content that a relation with the second observation confers on the first observation concept. They enable modeling of causality, implication, entailment, deduction etc.

iv. Deixis and Demonstratives

The phenomenon of a word changing its referent in a new context is called "deixis." This leads to a discussion of certain grammatical particles, which linguists call "demonstratives," whose current referent string is not explicit in local text and must be deduced by the reader. In the systems and methods described herein, the full concepts at the exact point marked by each grammatical can be explicitly inserted.

Grammaticals usually have totally different meanings each time they are used. It can often take a long text string to define the referent concept. For these insertions at a marked point the question often becomes where to find the string that defines which subconcept to insert. Their meaning may be supplied in adjacent text or it may not. Often the string, if there is space in the text for it right there, is found immediately following the grammatical particle. Sometimes, the text to be inserted at the point of the punctuation mark or grammatical particle is found, or as with the personal pronouns, in a separate sentence earlier in the text, anaphora or later in the text, cataphora. Sometimes it is not found at all in the text and must be made up from the second person's knowledge.

The phenomenon of deixis occurs when the same word refers to a different concept in each new context. The classic deictics are the personal pronouns I, HE, SHE, etc.

Deixis presents a major challenge to natural language parsing programs. When parsing text, it is essential to have a method for determining the precise referent of all deictic words in a given instance. In the systems and methods described herein, this is achieved by explicitly supplying the exact concept that each deictic is referring to in each instance.

The second view is generally how linguists have always approached certain grammaticals like the personal pronoun particles. They talk about identifying the "referent" of words like "he" and "you," which will change with each instance of their use in different contexts. This leads to a discussion of certain grammatical particles which linguists call "demonstratives," whose current referent string is not explicit locally in the text and must be deduced, i.e., obtained by applying algorithms to current data.

Thus, the exact concept that each deictic is referring to in each instance can be added as a duplicate join row to the table, where the deictic is replaced by the explicit concept ID# of the deictic's referent concept. For example, in the finite sentence "His theory makes no sense," the parser will need this join row:

histheory~makesnosense=observation 33

But if "It makes no sense" is used instead of the more explicit finite sentence, the parser will need this join row it~makesnosense=observation 33

Both rows can be provided usually next to each other. Such pair of rows are seen throughout M5 databases, to accommodate pronoun and other deictic references.

Linguists generally think of deixis as being confined to a limited number of the so-called deictic words of English: the personal pronouns, he, she, you, etc.; the interrogative pronouns who, what, which, when, where, how, why, how much; the demonstrative pronouns this, that, these, and those, etc. These short grammatical words refer to different concepts in different instances. They are equivalent to the x,y variables of algebra whose values vary, whereas lexical words are like the algebraic constants a, b and c whose values remain constant in a given context. When one considers that these short words often have referents that take long strings to define, whole sentences and even paragraphs, the purpose of deixis in language becomes immediately apparent. It is a natural form of data compression, which enables complex knowledge to be transmitted with many fewer words.

v. Finding the String to Insert

Another way to view deixis is to see that all words indicate an ellipsis; that there is something absent from the text, that a missing concept, often a large complex concept, should be added to the table in a duplicate join row where it takes the place of the deictic.

The function of a deictic is just to precisely locate where a complex concept should be placed, a concept for which the defining text is often supplied. The problem is to figure out just what that concept should be in different instances. In the above examples it was a string that appeared earlier in the same sentence and which was then repeated or it was found right after the insertion point. The referent of the deictic may be explicit in the text immediately after the grammatical, but it may also be supplied earlier in the text, anaphora, or later, cataphora. Sometimes the referent ellipsis expression is quite separate at the end of the sentence where there may be room for it, e.g., "I never thought it would come, the day of reckoning." Here, "it" stands for "the day of reckoning." In the wedding example above, the text defining the meaning of "do" was supplied in the previous question. Sometimes the elided expression is not supplied at all in the text and the reader/listener has to figure it out, e.g., by "reading between the lines." In any case ellipses must be made explicit in M5 by the M5 composer.

In language a deictic pronoun is often used instead of the full text of the subject of a finite sentence, which can be a problem for the parser. In any knowledge domain M5 table there may be several instances of join row:

he~is=heis

But the installer must make sure that join row:

heis~verb13=observation13

If the subject concept he joins with the same verb again another time the observation concept must be marked to indicate it is another instance of that same verb action and observation:

heis~verb13=observation13a

Language deals with this situation by adding words "too" or "again" to the verb phrase: "He found a parking place"; and "he found a parking place too (2)," indicating it is a different he in a different observation.

d. Dealing With Ellipsis

Ellipsis and deixis can be dealt with explicitly by supplying the referent of the deictic in every case where a deictic is used or might well be employed by a user, i.e., might have to be parsed in a user's input text. This can be done by making a duplicate of any join row that employs a deictic concept instead of the full concept ID#. If the original row joins a deictic's concept ID# word to another concept to produce a product concept, the duplicate row can use the actual concept ID# of the deictic's referent for the join to get the same concept product. So if a deictic is used in a particular context in a join instead of the actual concept ID#, the correct product concept number can be generated.

Therefore, the purpose of each grammatical is to stand in for a concept that is to be joined in to the complex concept being built.

Here is an actual example of a program run interrogating a specialized Fifth medium database constructed to hold sophisticated immunological knowledge. This actual exchange shows the program identifying the correctly referent of deictics these and they:

QUESTION
What cell populations are capable of causing tissue specific immunopathology after adoptive transfer into lymphopenic hosts?
ANSWER
CD4 + T cell populations depleted of regulatory T cell subsets
QUESTION
Why are these populations capable of causing tissue-specific immunopathology after adoptive transfer into lymphopenic hosts?
ANSWER
Because they contain active autoimmine T cells
Asked another way.
QUESTION
Why do they cause tissue-specific immunopathology after adoptive transfer into lymphopenic hosts?
ANSWER
Because these populations contain active autoimmine T cells
Probing deeper
QUESTION
How do cause tissue-specific immunopathology after adoptive transfer into lymphopenic hosts?
ANSWER
The self reactive T cells in this population, no longer suppressed by T reg cells, proliferate and attack self tissues.

Using the duplicate row method described above, the parser can correctly recognized that all of these deictics referred to the concept CD4+ T cell populations depleted of regulatory T cell subsets.

i. Local Search

When a question consists only of deictics without any specific concept names, as in: "Who did what?," "What happened then?," and "So?," it is necessary for the parser to be cognizant of, in each instance, which observation is the observation in question.

A human reader reading sentences of a text in order has an advantage in that he knows that the sentence he is reading now is the sentence of interest and will have little trouble resolving referent concepts of pronouns like "he," "it," or "that" or answering single word questions like "When?" or "Why?". However, answering a question asked at random where the information of interest can be anywhere in the knowledge domain requires determining which observation concept contains the information of interest. Thus, it should be ensured that even if a terse deictic only text input is entered, it will be parsed successfully by providing a hook in the form of at least one join row that allows the parser to lock onto the correct observation concept.

For example, predicate concepts are very useful in this regard. Any particular predicate text can be parsed readily and its concept ID# obtained. In most domains of knowledge a particular predicate concept will be a member concept of only one observation concept. It is "pathognomic" for that observation. When it is encountered the parser will know which observation it is dealing with. In this case the installer can safely edit the predicate concept ID# to the observation ID# so that when the parser parses that predicate it will obtain the observation ID#.

e. Zeroing in on the Observation in Question

Consider a small section of a knowledge domain source sourced from the text: "Harry did board the bus, it did arrive on time and Harry did meet Jane." Consider the following discourse:

A: "Harry did meet Jane."
B: "Did he?"
A: "Yes, Harry did."

This "Did he?" is the same question as "Did Harry meet Jane?," i.e., question concept Q32. For the parser to parse this "Did Harry meet Jane?" or "Did he meet Jane?" would require the parser to be able to consult an M5 table with the following joins:

meetJane=MJ
Did~Harry=didHarry
Did~he=Didhe
didHarry~MJ=Q32
Didhe~MJ=Q32

The response in the question concept Q32 row could be "Yes, Harry did."

For the parser to parse this "Did he?" would require the following join row to be in the M5 table with:

Didhe~?=Q32

But, there may be many instances of a join between these same two deictics in the database producing a different product concept each time. Lets say that in other parts of the M5 table, in order to be able to field other "Did He?" questions there are the rows:

Didhe~?=Q41
Didhe~?=Q73

How is the parser to find the right Didhe~? row? It can only be done in the context of a discourse like the one above. For example, the parser can be configured to monitor context and then not search globally, but rather search locally in the section of the table close to the last observation processed. This can be referred to as a local lookup of a legal join in the immediate area of the last observation processed.

For example, it a question comes out of the blue, the parser can search the table to see if a particular join is there in the following order: search in sentence first and then search globally.

f. Managing Lexical Words as Ellipsis Markers

Lexical words, i.e., nouns—verb combinations, adjectives and adverbs—provide sensory patterns that are familiar to the senses or the intellect. Lexical words also mark a spot where an ellipsis, the dictionary definition of the lexical word, could be inserted. A human mind parsing a lexical word does not have to experience its full definition in consciousness at that moment, confident it is available to him. The lexical word has been transmitted by the speaker, confident that that the second person can obtain its ellipsis from his memory if needed by a kind of mental dictionary lookup. This is the same as being confident that the lexical word will be "understood" by the second person. The word "theft" in an utterance could specify the insertion of an ellipsis such as "taking another's property stealthily without their permission with the intent of keeping it." There is no need to make this definition explicit in the text because this long string is understood by the second person.

In the case of "theft," the builder can be, e.g., configured to create a row in the database with the concept ID# being an initialism of the input string: TAPSWTPWTIOKI. Then the administrator would edit this long initialism concept ID# to theft. Then, whenever a speaker used that long string or a legal paraphrase, the parser program would reduce it to concept theft, the same concept ID# that the parsing of the lexical word "theft" would produce. Thus, it is assured that different paraphrases hone in on the same concept ID#. Paraphrase matching can be done by manual editing of the database or with programs that do it automatically.

The function of a lexical word therefore is essentially the same as that of the other two kinds of text element, grammaticals and punctuation marks; they mark a spot where an ellipsis is to be inserted. Again, in the interests of data compression to make the slow language communication channel more efficient.

g. Determining the Present Sense of Language Elements

The second person determines the sense of a word meant in any instance by considering the context of the word in that particular instance. This is easy for humans but has been a serious problem for cognitive scientists and natural language researchers trying to get computers to match this human facility. An enormous effort is presently ongoing on programs and databases that can determine the sense of lexical words in different contexts as by the development of the Wordnet Database at Princeton.

Just as a word can have many senses, the same chameleon quality applies equally to concepts; a particular concept identified by its ID# can have quite a different meaning when it takes its place in a different concept neighborhood.

In the systems and methods described herein, since the sense of a concept is determined by its environment of the neighboring concepts that it is combining with, sense can be "determined" by controlling the ID# of the product concept of its join with its neighbor.

Any lexical verb can have many shades of meaning depending on the context. For example, let's take the verb "swing." The sensory pattern of concept swing varies subtly in each of the following concepts: "He swings a baseball bat," "he swings his left arm," he swings his right arm," etc. This is shown dramatically by the zeugma "brush your teeth and hair". The meaning of brush, the concept brush, the "brush" sensory pattern itself, has changed so markedly by its relation to concept teeth that it is no longer capable of having a relation with concept hair, which needs a different distinct variant of concept brush. And this is indicated by a jarring effect in our mind.

Rather than attempting to track the shift in sense of concept brush by subtle, virtually impossible to compute with precision, adjustments of the brush concept ID#, the systems and methods described herein achieve the same end by fixing the concept ID# of the product. Concept brushyourhair has a fixed meaning, which reflects back to select the precise shade of meaning of brush that is required to generate this ID#.

Thus, the concept ID# is not varied to reflect different shades of meaning of a concept, an arduous manual task fraught with subjective decisions. Rather, the concept ID# of the higher order concept, of which this subconcept is a member, is used to manage its sense in each instance of its use. By controlling the concept ID# of the product concept of the join row where it joins with its neighbor concept, the correct sense of that concept is selected. For example, the two join rows from the zeugma "brush your teeth and hair"

brush~teeth=BT
brush~hair=BH

Precisely impose on concept brush the shade of meaning that concept brush has in each instance without needing to use fine adjustments of the ID# of brush like, say, brush1 and brush2.

As another example, take the sentences: "Did John steam iron his jeans?" and "Is the steam iron back in the laundry?"

didjohn~SIHJ=Q23
isTSI~BITL=Q24

These two join rows, the first putting concept SI (steam iron) in a verb setting, the second putting SI (steam iron) in a subject setting, ensure that the different meanings of SI (steam iron) are secured.

All the elements of language change their meaning in different contexts, even lexical words do. Most lexical words have different senses in different contexts. The "brush your teeth and hair" zeugma suggests that a lexical word's sense is infinitely variable, varying with context. But, once a lexical word is used in a particular sentence, it has already acquired its fully differentiated meaning. So, another way to view deixis is as a more general phenomenon in language, applying not just to demonstratives but also to all the elements of language: lexical words, phrases, and punctuation marks.

8. Interactive Graphical Methods for Building Complex Concepts

Using the systems and method described herein, concept trees that represent complex concepts like the above can be constructed using graphical representations and manipulating them with drag and drop procedures. By dragging text labeled graphic blocks that represent subconcepts together, e.g., using a mouse, a concept builder can indicate where they merge and construct a meaningful complex concept tree very rapidly.

These graphic representations can be used by educators to teach good writing since there is a close correspondence between the literary elegance of a sentence and the graphic elegance of its graphic tree representation. For example if a sample of a writers work were rendered graphically it would be immediately reveal how "articulate" and how elegant his prose was. And a writing style like Hemingway's would have a characteristic graphical pattern be immediately identifiable graphically.

And once a labeled concept tree is built, a simple program can output the knowledge it contains in natural language. Thus, if a writer had easy access to a "dictionary" of subconcepts related to a particular subject, he can write about a subject very rapidly and accurately with a few drag and drop actions of the mouse by connecting related concepts to construct complex ideas.

Grammaticals precisely specify where a branch concept is to be inserted and what subconcepts are on the branch. This allows very accurate graphics to be rendered illustrating the exact structures of complex concepts.

Use of animated graphics is useful to depict events or actions. Use of animated graphics is also useful in the analysis of humor 9. Extracting Information From an M5 Knowledge Base Knowledge organized in M5, has values and properties quite different from the same knowledge stored as text because it explicitly contains all the elided concepts, the referents of allusions and metaphors, and lexical word definitions normally left out of text.

M5 lists all the concepts in a domain of knowledge, plus specific information about the relations between them, along with as much metadata about each concept as desired. M5 is therefore a richer more dense, more comprehensive representation of the knowledge in a domain because all the concepts left out in language have been added back in, lexical word definitions, the concept-ellipses, the allusions, and the meaning of the metaphors.

Once all the explicit and implicit concepts of a domain of knowledge have been installed in a tree of joins, such Database Stored Knowledge, or any part of it, or a selected composition of parts, sorted by metadata markers, etc., can be programmatically delivered in language medium along with suitably embedded graphics. This becomes possible because the source content is ideas not text.

Thus, a relatively simple computer program can read an M5 format version of a knowledge domain, understand the concepts there, and extract any particular desired item of knowledge automatically.

Since M5 databases have no ellipses, they can be sorted and searched with great flexibility, synonyms and paraphrases, and access to word definitions present no problem, M5 information extraction methods can be much more powerful and precise than key word searches on language texts.

A common function, given the text of a concept, for system 1102 is to return the row number, the concept number of the concept, and to perform the response stored at that address. Another useful extraction function finds all the observation concept or paragraph concepts that a particular subconcept is party to and returns the list or their texts. This could be invoked by calling function S, (subconceptA) or by the input text: "Tell me all about A". Another extraction function could return all observations that two or more subconcepts share party to. This could be invoked by calling function S, (A, B). This same extraction function could also be invoked with the text input: "What has A got to do with B?" or "Has A got anything to do with B?" Similar types of programmatic processing of M5 data structures to extract specific information could be triggered by input text probes like "What does A think about B?" or "What did A do about B?"

10. Speak Algorithms, to "Speak" Concept ID#s

It is important to be able to generate text for any concept. Here is a function that takes the concept number as a parameter and returns the text that means that concept, i.e., speaks that concept. Such a function can be configured to start with a root node concept ID# and derives an ordered string of component concept ID#s and finally an ordered string of text elements: lexical words, grammaticals and punctuation marks.

It can run as follows: look up the root concept ID# in the table, start a string with the two component #s that were joined to make it. Look up the first of these and replace it with its two component concept ID#s in order. Look up the second concept ID# and replace it with its two components. Now it is a string of four. Start again with the first number and replace it with its components in order. Do this for the other three. Now it is a string of 8 concept ID#s. Continue this process until the string consists of leaf concepts numbers that do not have parts. Then replace these with the elements of text that they stand for.

Since compositions of concept numbers can be readily generated with search and sort operations on an M5 database sets, such compositions of concept numbers are "spoken" by applying the above function to each number in turn.

11. Finding Observation (or Paragraph) Concepts in Which a Concept Resides

Such a function can be configured to run as follows: Look its # up just in join column rows that have the same observation number in the order column, and replace it with the join's product concept ID#. Continue lookup just in rows with the same observation # in the order column until the # is an observation concept ID# or if wanted a paragraph concept ID#.

A function to find all the observations in the table that a particular concept takes part in runs as follows: look up the product concept ID# in the join column of all the rows of the table. Make a string of the corresponding product concept ID#s. Look these up in turn in the join column and replace each in the string with its corresponding product concept ID#.

Continue until all of the concept ID#s in the string are observation concept ID#s or if wanted paragraph concept ID#s.

Such a function can be useful in dealing with an inquiry like: "Tell me all about the role of human activity in climate change." The response would be to speak all the observations in which the concept the role of human activity in climate change was a component concept, whether this concept was:
   a) present in the original text by paraphrase or synonym;
   b) absent by ellipsis from the text; or
   c) present in a definition of one of the lexical words or phrases of the original text.

Such compositions could be automatically deftly tuned and pruned for relevance, importance and grouping by judicious use of concept metadata.

12. Finding Observation (or Paragraph) Concepts in Which Two (or More) Concepts are Related This could be probed with a text input question like "What has A got to do with B?"

13. Application of the Invention to Search Techniques

"Searching within words": When the original text of a knowledge domain is installed in M5, lexical words can be treated as atomic concepts. If a question were to be asked which used terms of the dictionary definition of one of the lexical words rather than the lexical word itself it would not be expected to be able to derive the meaning of the question. To solve this problem, a dictionary of lexical word definitions can be made available to the parser. Each dictionary definition would consist of a few standard join rows. For example, the knowledge in the following text can be installed: "Tom robbed a bank, Dick committed burglary, and Harry committed theft." With definitions of robbery, burglary, and theft in place, if the question were posed: "Did Tom take property that did not belong to him by force or threat with the intention of keeping it?," the parser, making use of the dictionary definition file, would parse the long string "take property that did not belong to him by force or threat with the intention of keeping it" to obtain the concept ID# robbery, simplifying the question to "Did Tom commit robbery?" which could be fielded easily.

As each new domain of knowledge is installed, a definition for each lexical word used, if not already defined, can be added via an appropriate set of join rows. Over time an extensive dictionary would develop and be available to the parser. This would mean that any definition would only have to be created once. New knowledge domains could then be installed in M5 with only the occasional need for a definition construction, i.e., when a novel lexical word was encountered.

Such a dictionary file serving the parser, making computer access to knowledge stored in M5 vastly superior to key word search for knowledge stored in language text, would add greatly to the advantages of M5 over text as a declarative knowledge repository.

14. Method for Indexing a Large Text Corpus to Allow Searching for Concepts

A concept ID# generating system can be configured to insert initialisms, preferably hidden, in the text next to every occurrence of the text phrase or expression that means the concept, for all concepts of interest in the corpus. This list of concepts of interest can be much the same as the contents of a regular book index. Page, paragraph, and sentence locations of concepts referred to in the text can then be readily found by standard text search programs. The user generates and then inputs the initialism of the phrase defining the concept in a search box. An intermediate match table converts the initialism of any legal paraphrases that could be used to the preferred initialism for the concept sought before the text search is performed Alternatively all the legal initialisms could be embedded as a set in the text at the appropriate location in the document.

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

The invention claimed is:

1. A system for knowledge representation in a computer that can enable natural language communication with a computer, the system comprising:
   at least one hardware processor;
   at least one database configured to store at least one table, the at least one table configured to store associations between concepts in a body of text and associated concept identifiers; and
   a builder interfaced with the database, the builder configured to, when executed by the at least one hardware processor, construct a table that represents knowledge defined by a body of text comprising words and punctuation, the construction of the table comprising
   assigning a unique identifier to an observation concept defined by the body of text,
   building a tree comprising a plurality of sub-concepts by
      breaking the observation concept into sub-concepts by identifying a subject concept, a seam concept, and a relative concept, and
      joining sub-concepts into higher order sub-concepts until two or more sub-concepts join to form the concept, wherein said joining comprises
         constructing a binary concept by either joining the subject concept and the seam concept or joining the seam concept and the relative concept, and
         constructing a first higher order sub-concept by joining either the relative concept or the subject concept with the binary concept,
      assigning unique identifiers to each of the plurality of sub-concepts including the subject concept, the seam concept, the relative concept, the binary concept, and the first higher order sub-concept, wherein the unique identifiers assigned to the observation concept and each of the plurality of sub-concepts are generated according to the same scheme, and
      storing each of the concept and plurality of sub-concepts in a row in the at least one table, wherein each row comprises the concept or sub-concept, the unique identifier assigned to the concept or sub-concept, and the unique identifiers assigned to two or more lower order sub-concepts, if any, which were joined to form the concept or sub-concept;
   wherein the plurality of sub-concepts comprise at least each of the words and punctuation in the body of text.

2. The system of claim 1, wherein the construction of the table further comprises constructing a pre-modifier concept and assigning a unique identifier to the pre-modifier concept, and forming a second higher order sub-concept by joining the pre-modifier concept with the first higher order sub-concept and assigning a unique identifier to the second higher order sub-concept.

3. The system of claim 1, wherein the construction of the table further comprises constructing a post-modifier concept and assigning a unique identifier to the post-modifier concept, and forming a second higher order sub-concept by joining the post-modifier concept with the first higher order sub-concept and assigning a unique identifier to the second higher order sub-concept.

4. The system of claim 1, wherein the unique identifiers assigned to the observation concept and plurality of sub-concepts comprise one or more of numeric identifiers, alphanumeric identifiers, row numbers, random numbers, acronyms, words, or letters.

5. The system of claim 1, wherein the builder is configured to construct a unique identifier from a first letter of each word comprising a concept or sub-concept.

6. The system of claim 1, wherein the builder is configured to construct a unique identifier from a word comprising a sub-concept.

7. The system of claim 1, wherein the builder is further configured to form higher order sub-concepts by joining the sub-concepts that represent the words and punctuation.

8. The system of claim 1, wherein each row of the at least one table further comprises metadata associated with a corresponding concept or sub-concept.

9. The system of claim 8, wherein the metadata comprises a vocabulary representation, if applicable, and a textual representation of the associated concept or sub-concept.

10. The system of claim 1, wherein each row of the at least one table further comprises a field comprising a response, if any, associated with the corresponding concept or sub-concept.

11. The system of claim 1, wherein the builder is configured to form higher order sub-concepts by receiving a drag-and-drop action, which comprises dragging a concept from one row and dropping it onto a concept in another row.

12. The system of claim 1, wherein the body of text-comprises one or more of a paragraph, chapter, book, article, or publication, and wherein the at least one table comprises a plurality of rows corresponding to observation concepts constructed by the builder to represent the knowledge represented in the body of text.

13. The system of claim 1, wherein the body of text describes an item or product, and wherein the at least one table constructed by the builder to represent the item or product can be used to tag the item.

14. A system for knowledge representation in a computer that can enable natural language communication with a computer, the system comprising:
   at least one hardware processor;
   a user interface configured to receive an input text string;
   at least one database including at least one table representing at least one concept tree,
      wherein the concept tree comprises a plurality of concepts, the plurality of concepts comprising a single root concept, a plurality of elementary concepts comprising words and punctuation, and joins between two or more of the plurality of elementary concepts,
      wherein the plurality of concepts further comprise a subject concept, a seam concept, a relative concept, a binary concept, and a higher-order concept,
      wherein the binary concept comprises a loin between either the subject concept and the seam concept or the seam concept and the relative concept, and
      wherein the higher-order concept comprises a join between the binary concept and either the relative concept or the subject concept,
      wherein the at least one table comprises a row for each of the plurality of concepts, each row comprising the concept, a unique identifier associated with the concept, and unique identifiers associated with two or more lower order concepts, if any, which form the concept, and wherein the unique identifiers associated with each of the plurality of concepts are according to the same scheme; and a parser interfaced with the at least one database and the user interface, the parser configured to, when executed by the at least one hardware processor, identify a concept represented by the text string, the identification of the concept comprising breaking the text string into separate elements of language, the elements including words and punctuation, using the separate elements of language to form an ordered string of concepts, and forming higher order concepts comprising two lower order concepts, by searching the at least one table for joins between concepts, until the concept represented by the text string is formed.

15. The system of claim 14, wherein each row of the at least one table further comprises a field comprising a response, if any, associated with the corresponding concept, and wherein the system further comprises a responder configured to carry out instructions specified by the response.

16. The system of claim 15, wherein the responder is configured to output a text string to a display via the user interface as instructed by the response.

17. The system of claim 15, wherein the responder is configured to output an audio stream via the user interface as instructed by the response.

18. The system of claim 15, wherein the responder is configured to open a file or run a computer program as instructed by the response.

19. The system of claim 15, wherein the responder is configured to access a web site as instructed by the response.

20. The system of claim 14, wherein the user interface comprises a speech-to-text converter, and wherein the user interface is configured to generate the input text string from a speech input.

21. The system of claim 17, wherein the user interface comprises a text-to-speech converter and wherein the user interface is configured to generate the audio stream from a text string received from the responder.

* * * * *